US011196486B2

(12) United States Patent
Hosseini et al.

(10) Patent No.: US 11,196,486 B2
(45) Date of Patent: Dec. 7, 2021

(54) ARRAY-BASED FREE-SPACE OPTICAL COMMUNICATION LINKS

(71) Applicant: Analog Photonics LLC, Boston, MA (US)

(72) Inventors: Ehsan Shah Hosseini, Boston, MA (US); Michael Robert Watts, Hingham, MA (US)

(73) Assignee: Analog Photonics LLC, Boston, MA (US)

( * ) Notice: Subject to any disclaimer, the term of this patent is extended or adjusted under 35 U.S.C. 154(b) by 0 days.

(21) Appl. No.: 17/092,531

(22) Filed: Nov. 9, 2020

(65) Prior Publication Data
US 2021/0152243 A1 May 20, 2021

Related U.S. Application Data

(60) Provisional application No. 62/935,471, filed on Nov. 14, 2019.

(51) Int. Cl.
*H04B 10/00* (2013.01)
*H04B 10/112* (2013.01)

(52) U.S. Cl.
CPC .................. *H04B 10/112* (2013.01)

(58) Field of Classification Search
CPC ... H04B 10/11; H04B 10/112; H04B 10/1123; H04B 10/1127; H04B 10/1125; H04B 10/1129; H04B 10/114; H04B 10/1143; H04B 10/1149; H04B 10/40; H04B 10/116; H04B 10/118

USPC ....... 398/118, 119, 120, 121, 122, 123, 124, 398/125, 126, 127, 128, 129, 130, 131, 398/135, 136, 158, 159, 33, 38
See application file for complete search history.

(56) References Cited

U.S. PATENT DOCUMENTS

| 5,517,016 | A | 5/1996 | Lesh et al. |
| 6,522,437 | B2 | 2/2003 | Presley et al. |
| 6,763,196 | B2 | 7/2004 | Yafuso |
| 7,230,227 | B2 | 6/2007 | Wilcken et al. |
| 7,283,751 | B2* | 10/2007 | Bruesselbach ....... H04B 10/112 398/119 |
| 7,643,755 | B2 | 1/2010 | Rafferty et al. |
| 10,419,113 | B2* | 9/2019 | Dawson ............... H01Q 3/2676 |
| 10,944,477 | B2* | 3/2021 | Fatemi .................. H04B 10/40 |
| 2004/0033004 | A1 | 2/2004 | Welch et al. |

(Continued)

OTHER PUBLICATIONS

Bashir, "Free-Space Optical Communications with Detector Arrays", arXiv:1811.07990v1 [eess.SP] Nov. 19, 2018.

(Continued)

*Primary Examiner* — Hanh Phan
(74) *Attorney, Agent, or Firm* — Young Basile Hanlon & MacFarlane, P.C.

(57) ABSTRACT

Optical communication with a remote node comprises: transmitting at least one optical beam to the remote node; receiving at least a portion of at least one optical beam from the remote node; providing intensity information based on one or more signals from one or more optical detector modules in an array of optical detector modules detecting the portion of the optical beam received from the remote node; and controlling at least one optical phased array to steer the optical beam transmitted to the remote node based on intensity information received from the remote node.

20 Claims, 29 Drawing Sheets

(56) References Cited

U.S. PATENT DOCUMENTS

| | | | |
|---|---|---|---|
| 2006/0076473 A1* | 4/2006 | Wilcken | H04B 10/1121 |
| | | | 250/214 A |
| 2015/0349881 A1* | 12/2015 | Byers | H04B 10/1123 |
| | | | 398/38 |
| 2016/0309065 A1 | 10/2016 | Karafin et al. | |
| 2018/0052378 A1* | 2/2018 | Shin | G01S 17/42 |
| 2018/0120440 A1 | 5/2018 | O'Keeffe | |
| 2018/0267250 A1 | 9/2018 | Hosseini et al. | |
| 2021/0013966 A1* | 1/2021 | Haraguchi | H04B 10/548 |

OTHER PUBLICATIONS

Byrd et al., "Free-space Communication Links with Transmitting and Receiving Integrated Optical Phased Arrays", Frontiers in Optics/Laser Science, 2018.

Kaushal et al., "Free Space Optical Communication: Challenges and Mitigation Techniques", arXiv:1506.04836v1 [cs.IT] Jun. 16, 2015.

Ma et al., "Aperture-array acquisition scheme for optical links in atmospheric turbulence", Applied Optics, vol. 49, No. 1, pp. 718-723, Feb. 1, 2010.

Polkoo et al., "Imaging-based beam steering for free-space optical communication", Applied Optics, vol. 58, No. 13, pp. D12-D21, May 1, 2019.

Serati et al., "Phased Array of Phased Arrays for Free Space Optical Communications", Conference Paper in IEEE Aerospace Conference Proceedings, Feb. 2003.

Umezawa et al., "High Speed 2-D Photodetector Array for Space and Mode-Division Multiplexing Fiber Communications", Journal of Lightwave Technology, vol. 36, No. 17, pp. 3684-3682, Sep. 1, 2018.

\* cited by examiner

ARRAY-BASED FREE-SPACE OPTICAL COMMUNICATION LINKS

CROSS-REFERENCE TO RELATED APPLICATION(S)

This application claims priority to and the benefit of U.S. Provisional Application Patent Ser. No. 62/935,471, entitled "Array Based Free Space Optical Communication Links," filed Nov. 14, 2019, the entire disclosure of which is hereby incorporated by reference.

STATEMENT AS TO FEDERALLY SPONSORED RESEARCH

This invention was made with government support under Grant No. N68335-19-C-0776 awarded by the U.S. Navy and Grant Nos. W911NF-19-2-0187 and W911QX-20-P-0132 awarded by the U.S. Army. The government has certain rights in the invention.

TECHNICAL FIELD

This disclosure relates to array-based free-space optical communication links.

BACKGROUND

Some free-space optical (FSO) communication links work with optical elements arranged for point-to-point communication. For example, two nodes that are communicating with each other over a point-to-point communication link may each use a telescope arrangement that include relatively large lenses for directing respective optical beams from a transmitting aperture of one node to a receiving aperture of another node. Such FSO communication links are potentially sensitive to impairments such as misalignment, vibration, and scintillation.

SUMMARY

In one aspect, in general, an apparatus for optical communication with a remote node comprises: a receiver module configured to receive at least a portion of at least one optical beam from the remote node, the receiver module comprising: at least one array of optical detector modules, and circuitry configured to control the optical detector modules and provide intensity information based on one or more signals from one or more of the optical detector modules; and a transmitter module configured to transmit at least one optical beam to the remote node, the transmitter module comprising: at least one optical phased array providing the optical beam transmitted to the remote node, and circuitry configured to receive intensity information from the remote node for controlling the optical phased array to steer the optical beam transmitted to the remote node.

In another aspect, in general, a method for optical communication with a remote node comprises: transmitting at least one optical beam to the remote node; receiving at least a portion of at least one optical beam from the remote node; providing intensity information based on one or more signals from one or more optical detector modules in an array of optical detector modules detecting the portion of the optical beam received from the remote node; and controlling at least one optical phased array to steer the optical beam transmitted to the remote node based on intensity information received from the remote node.

Aspects can include one or more of the following features.

The array of optical detector modules comprises a two-dimensional array of photodiodes that each provide a respective photocurrent to a corresponding amplifier.

The photodiodes comprise avalanche photodiodes, and the amplifiers comprise transimpedance amplifiers.

The circuitry of the receiver module is configured to determine a subset of fewer than all of the amplifiers that are powered on based at least in part on comparing the photocurrent in the corresponding amplifier to a threshold.

The circuitry of the receiver module is configured to determine a first subset of the photodiodes that are receiving at least a portion of the optical beam, and a second subset of the photodiodes that are receiving at least a portion of another optical beam.

The receiver module further comprises a light source providing a coherent local oscillator beam for coherently receiving the optical beam.

The light source provides multiple coherent local oscillator beams for coherently receiving multiple optical beams concurrently.

The intensity information from the remote node is received by the circuitry of the transmitter module over a side-channel network that is separate from a free space optical communication link with the remote node, at least during setup of the free space optical communication link.

Additional intensity information from the remote node is received by the circuitry of the transmitter module for controlling the optical phased array over the free space optical communication link after setup of the free space optical communication link.

The receiver module further comprises a microlens array in proximity to the array of optical detector modules.

The receiver module further comprises at least one lens configured to focus light in proximity to the microlens array.

A distance between the microlens array and the lens is larger than or smaller than a focal distance of the lens by at least 5%.

The receiver module further comprises at least one lens configured to focus light in proximity to the array of optical detector modules.

A distance between the array of optical detector modules and the lens is larger than or smaller than a focal distance of the lens by at least 5%.

The array of optical detector modules comprises an array of photodetectors in a photonic integrated circuit.

The optical phased array comprises a two-dimensional array of optical emitters that are each coupled to a respective optical phase shifter, wherein respective phase shift signals applied to the optical phase shifters control steering of a propagation axis of the optical beam transmitted to the remote node within at least a first plane.

Respective phase shift signals applied to the optical phase shifters control steering of the propagation axis of the optical beam transmitted to the remote node within a second plane perpendicular to the first plane.

Wavelength tuning of optical waves emitted from the optical emitters control steering of the propagation axis of the optical beam transmitted to the remote node within a second plane perpendicular to the first plane.

Aspects can have one or more of the following advantages.

In some implementations of a communication system described herein, a transmitter module is able to dynamically steer light from a transmitting aperture, and a receiver module is able to collect light from a receiving aperture to recover data being communicated over the link and intensity information used for dynamic steering. In some implementations, the transmitter module uses an optical phased array (OPA) (e.g., an OPA integrated onto an optical chip) for dynamic steering, and the receiver module uses a high-speed detector array system. Such dynamic alignment can be useful, for example, to provide a high-speed optical communication system that is less sensitive to some of the potential impairment such as such as misalignment, vibration, and scintillation. In some implementations, portions of the system can be mounted on moving transmitter (Tx) and receiver (Rx) platforms, which can further facilitate dynamic alignment of the system.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
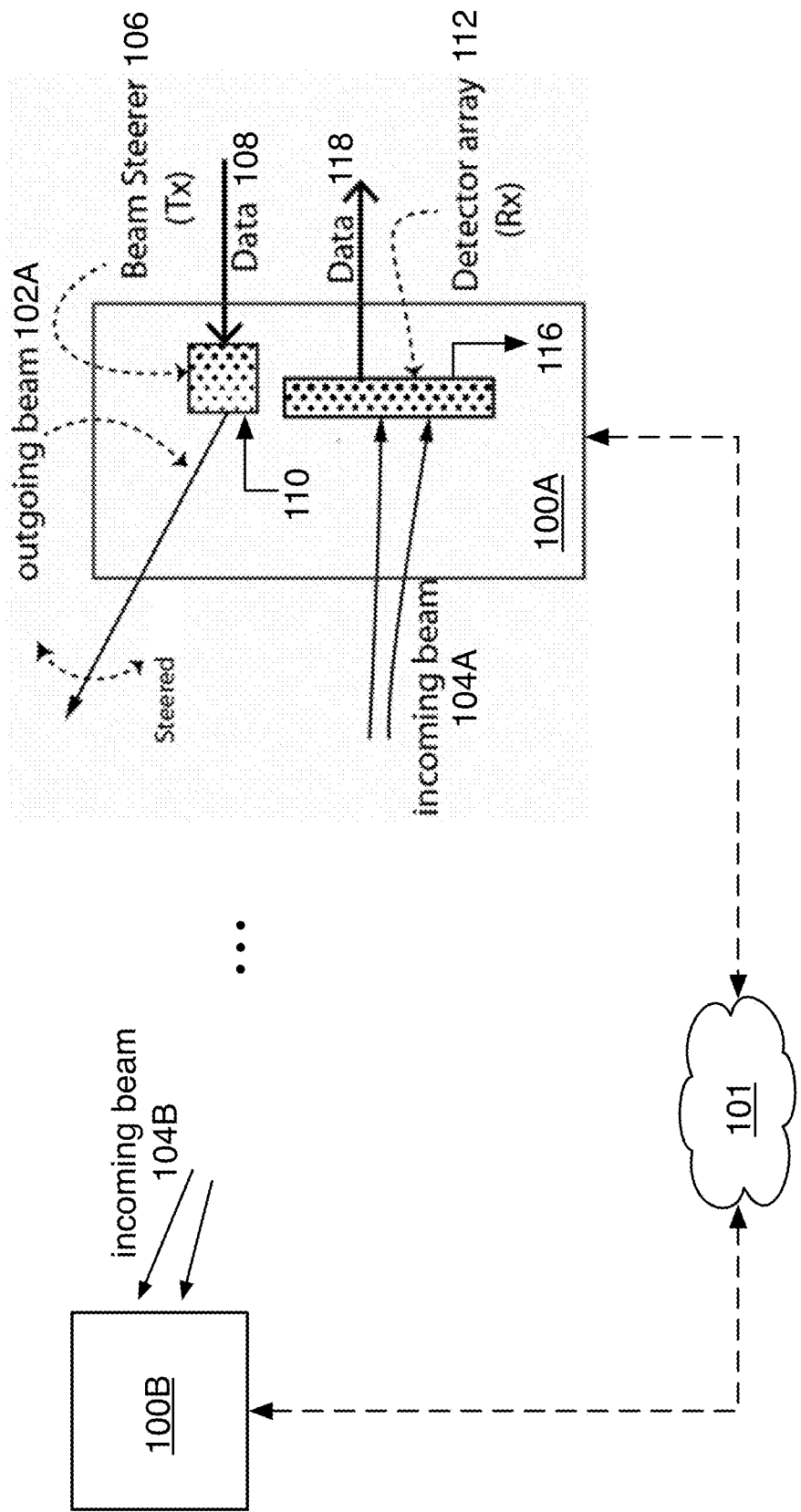
FIG. 1A is a schematic diagram of an example communication system.

Referring to FIG. 1A, an example communication system includes a local node 100A and a remote node 100B, which are configured to communicate over a high-speed FSO bi-directional communication link (or simply "FSO link") that uses optical beams transmitted in both directions between the communication nodes 100A and 100B. There is also a side-channel bi-directional communication link (or simply "side-channel link") that is used in some implementations for initial alignment and/or ongoing dynamic alignment, as described in more detail below. The side-channel link does not need to be particularly high speed (e.g., slower by an order of magnitude or more than the FSO link), but may provide a relatively low latency. For example, a side-channel network 101 can be any of a variety of types of networks, including a point-to-point network dedicated to the nodes 100A and 100B, and can use any of a variety of communication media such as: wired media (e.g., coaxial cable), wireless media such as radio frequency (RF) links, and/or optical media (e.g., optical fiber).

In this example, the local node 100A is configured to provide an outgoing beam 102A that is able to be steered over a solid angle in the direction of the remote node 100B, and to receive an incoming beam 104A. A beam steerer 106 can be configured to use any of a variety of techniques to steer the outgoing beam 102A, including optical phased arrays, as described in more detail below. The local node 100A is also configured to modulate data from an incoming data stream 108 onto the outgoing beam 102A. An incoming intensity feedback port 110 provides intensity information that was sent by the remote node 102B over the side-channel network 101, which is used by the beam steerer 106 to steer the outgoing beam 102A. The local node 100A also includes a detector array 112 that includes a distribution of closely spaced optical detector modules whose detected signals representing individual pixels of a detection area. The detector array 112, the beam steerer 106, and other components in the node 100A can be supported a platform or other rigid structure, for example. In some implementations, the remote node 100B includes the same components as the local node 100A. Some configuration and alignment procedures will be described in the context of the local node 100A, but substantially the same procedures may also be performed at the remote node 100B.

Generally, the incoming beam 104A has an incident optical intensity profile that is spread over a number of pixels. The local node 102A includes circuitry configured to control the optical detector modules of the detector array 112 and to provide intensity information from an outgoing intensity feedback port 116 for transmission to the remote node 100B. The intensity information based signals from the optical detector modules at one node can be sent to the other node in order to guide dynamic steering of the beams to compensate for drift of the intensity profile over the pixels due to atmospheric effects (e.g., intensity scintillation due to turbulence in the air between the nodes) and/or movement of one or both of the nodes. Power can also be saved by controlling which optical detector modules are active at the same time during detection. For example, an optical detector module can include a two-dimensional array of photodiodes (e.g., avalanche photodiodes) that each provide a respective photocurrent to a corresponding amplifier (e.g., a transimpedance amplifier). The amplifier can be turned on or off as appropriate to save power based on whether or not an output of the photodiode is above a threshold.

When the FSO link between the nodes 100A and 100B is initially set up there is an initial alignment procedure that includes a rough alignment phase and a fine alignment phase. During the rough alignment phase, the outgoing beam 102A is aimed in an approximate direction that is assumed to be directed at the remote node 100B according to predetermined location information (e.g., GPS coordinates or other absolute or relative coordinates). The rough alignment phase may also optionally include approximate steering using information from a telescope at the local node 100A and/or from a retroreflector that is on or in proximity to the remote node 100B. The rough alignment phase may not be necessary for some communication sessions, for example, if the outgoing beam 102A is already approximately aligned from a previous FSO link that was used between the nodes 100A and 100B.

When the outgoing beam 102A arrives at the remote node 100B as an incoming beam 104B, the fine alignment phase can be used to ensure the incoming beam 104B is appropriately positioned with respect to a detector array of the remote node 100B. In some cases, the incoming beam 104B may represent only a portion of the power from the outgoing beam 104A due to absorption or other impairments from atmospheric propagation or due to beam spreading, for example. As part of the fine alignment phase, intensity information can be captured at the remote node 100B and provide over the side-channel network 101 to the intensity feedback port 110. The intensity information can include a signal quality measure that indicates how much of the power in the incoming beam 104B is being detected by optical detector modules in the detector array of the remote node 100B.

After the FSO link is operational, there can also be ongoing dynamic alignment that is used to continue to steer the outgoing beam 102A based on intensity information used as feedback from the remote node 100B. For example, steering may be needed to adjust for changing atmospheric conditions that affect the propagation direction of the beam. In some implementations, after the FSO link is operational, instead of using the side-channel network 101 send the intensity information between the nodes for dynamic alignment of the beams in both directions, the intensity information can be sent as information embedded within the data communication streams in both directions (e.g., using time domain or frequency domain multiplexing).

Figure 1B:
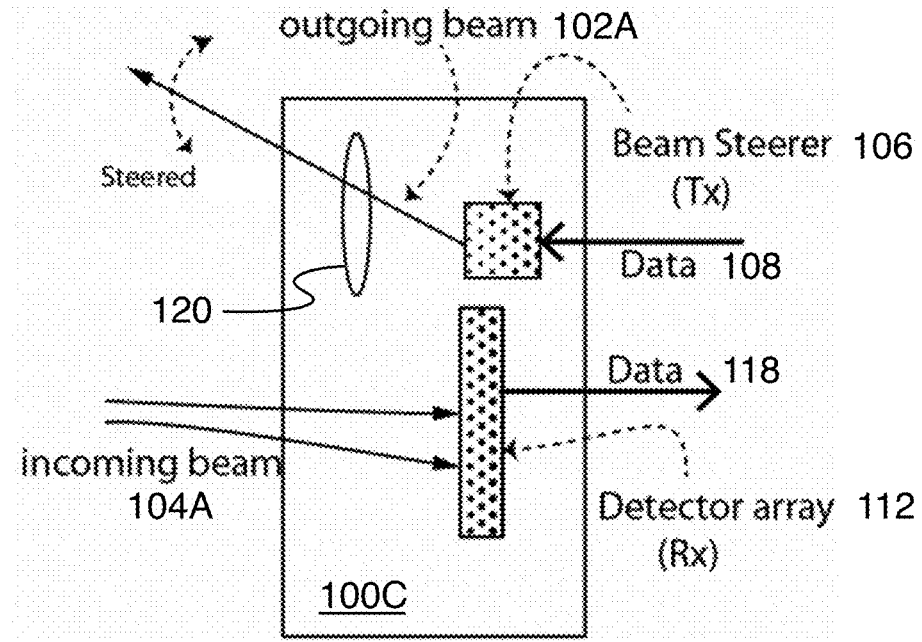
FIGS. 1B-1E are schematic diagrams of alternative communication nodes.
Figure 1C:
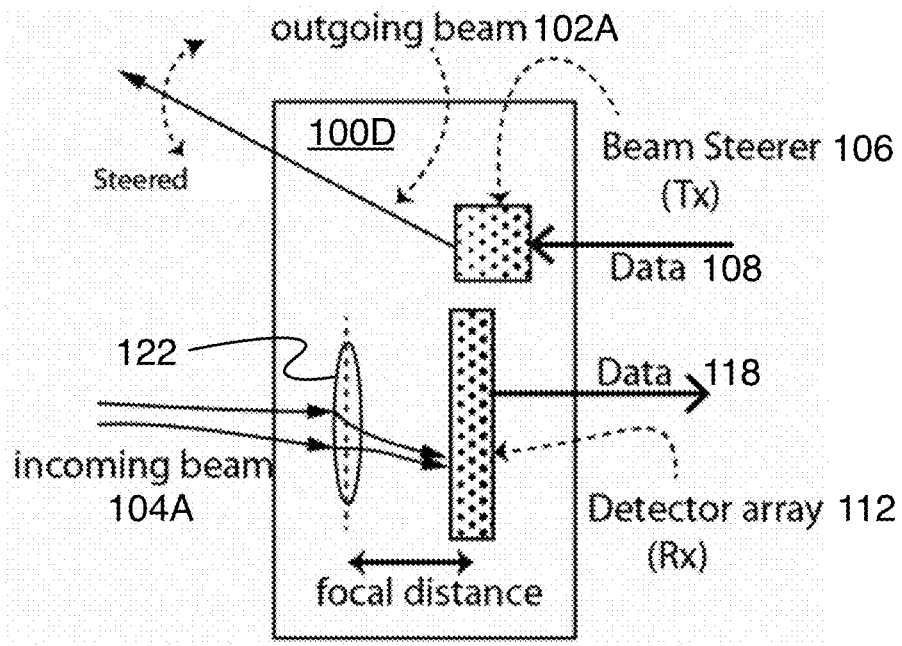
Figure 1D:
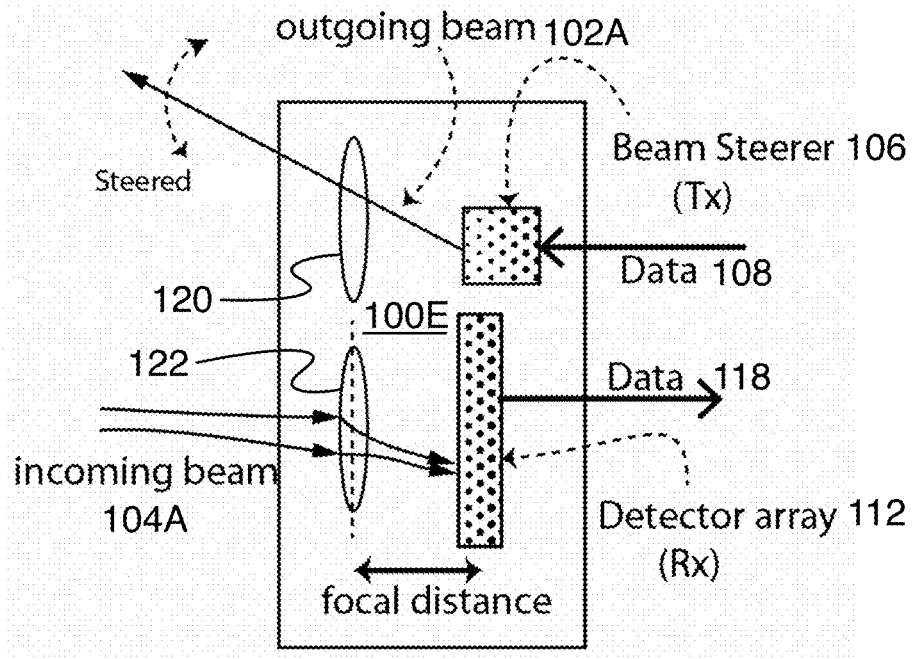

FIGS. 1B-1E show examples of alternative implementations of a communication node. Referring to FIG. 1B, a node 100C includes a lens 120, or other beam shaping optical elements, to limit the beam divergence and ensure the incoming beam at the remote node remains relatively well focused. Referring to FIG. 1C, a node 100D includes a lens 122, or other beam shaping optical elements, to collect light from across the lens aperture and focus at least a portion of the incoming beam 104A onto a portion of the detector array 112 (e.g., to one or a relatively small number of pixels). In the example of FIG. 1D, a node 100E includes both the transmitter-side lens 120 and the receiver-side lens 122. For the node 100C without the transmitter-side lens, a larger field of view can be achieved in some implementations. For the node 100B without the receiver-side lens, a lower sensitivity to alignment errors can be achieved in some implementations.

Figure 1E:
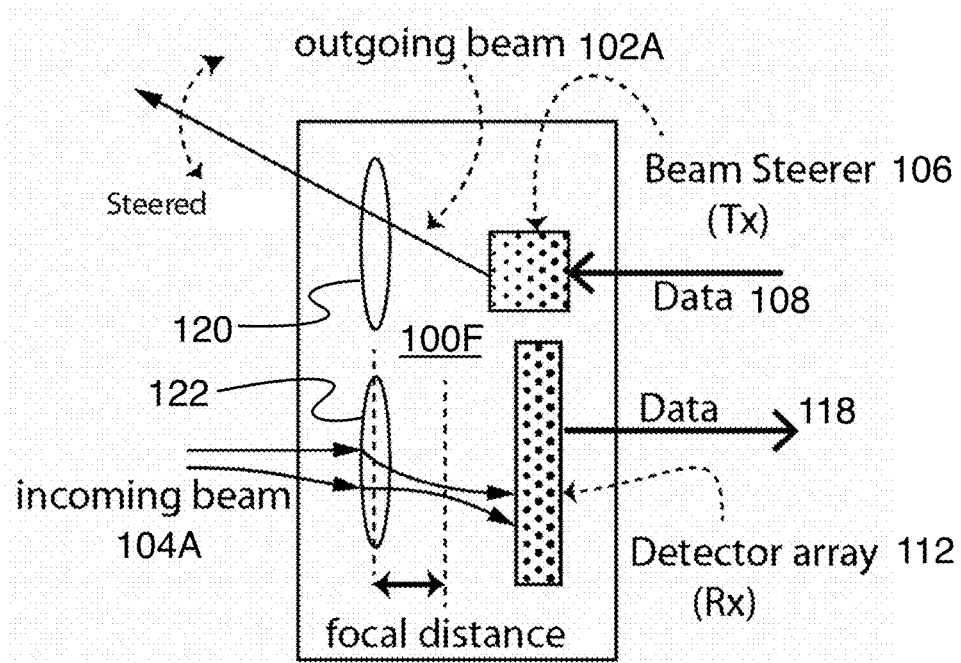

Referring to FIG. 1E, the detector array 112 can be located at a distance that is not exactly coincident with a focal plane associated with the receiver-side lens 122. For example, for an optical beam that is substantially collimated (e.g., for propagation over a relatively long distance), the tightest spot size after the receiver-side lens 122 would be close to the focal distance of the lens 122. Placing the detector array 112 at a distance farther than the focal distance (or closer than the focal distance) would lead to a beam that is not perfectly focused at the detector array 112, which can beneficial in some implementations, as explained in more detail below. The amount of defocus can vary, but in some implementations the distance between the lens 122 and the detector array 112 is larger or smaller than the focal distance by at least around 5% or more, or at least around 10% or more.

Figure 2:
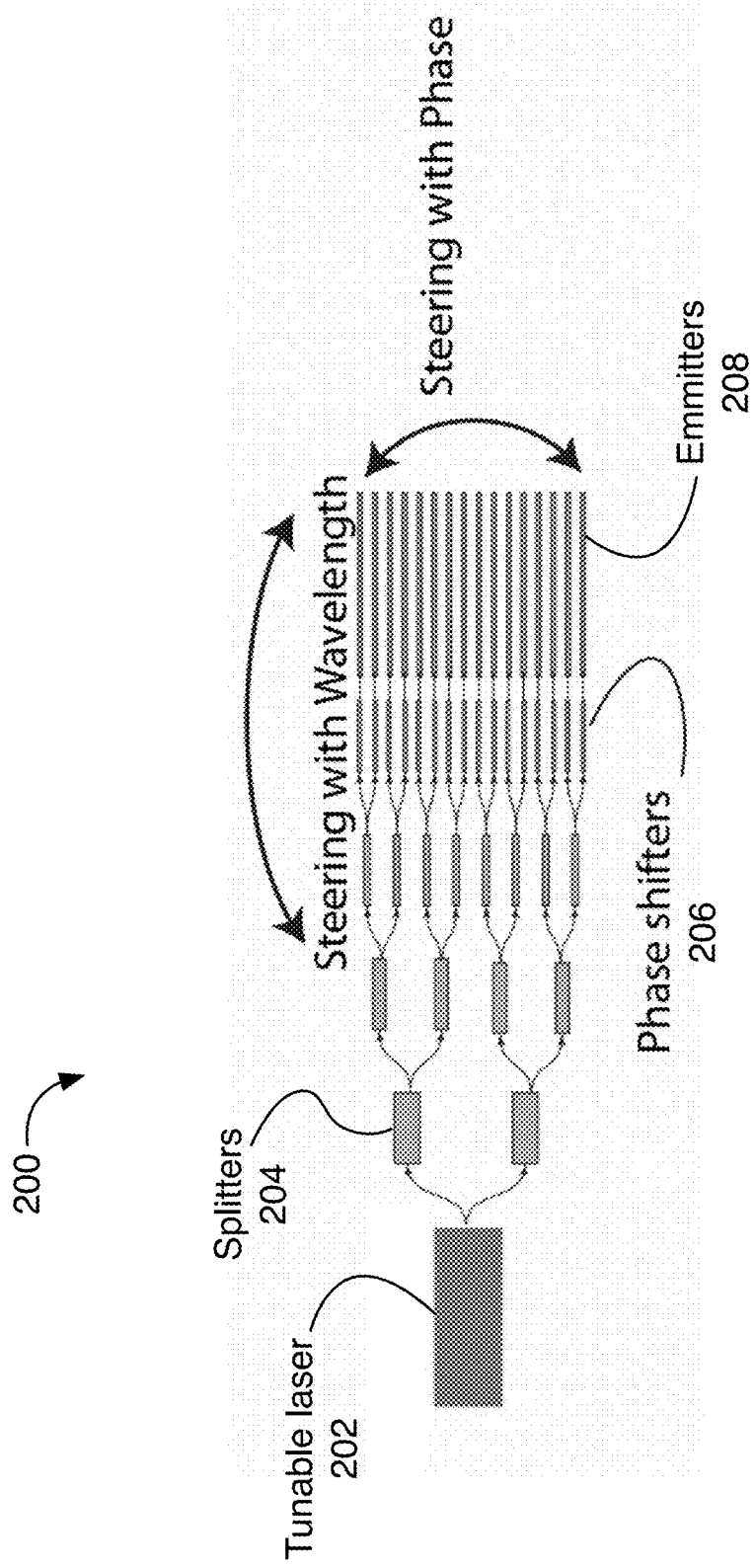
FIG. 2 is a schematic diagram of an example beam steering arrangement.

Referring to FIG. 2, an example of a beam steering arrangement 200 includes a tunable laser 202, which can be modulated (e.g., using intensity modulation) with data from an incoming data stream (e.g., with binary data symbols mapped to different intensity levels). The light is then distributed by a network of splitters 204 to an array of phase shifters 206 and an array of optical emitters 208. This optical phased array can be steered in two angular dimensions using wavelength and phase. The tunable laser 202 can have its wavelength (or equivalently, its frequency) tuned in order to steer over one angular dimension of a solid angle, and the phase shifters 206 can have their relative phase shifts tuned in order to steer over another angular dimension of the solid angle.

Figure 3A:
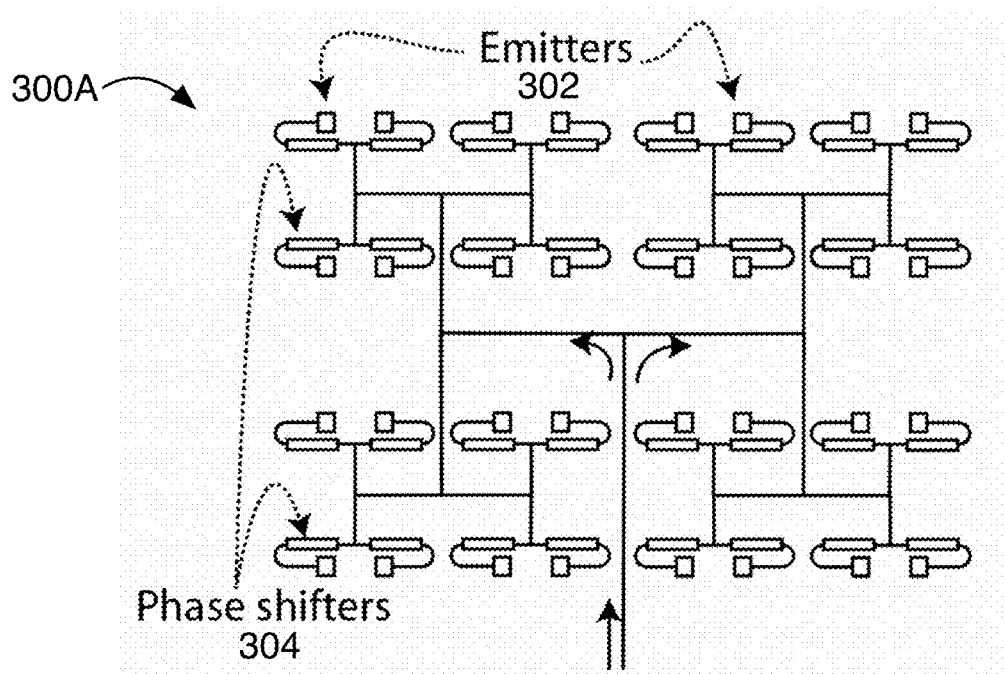
FIGS. 3A and 3B are schematic diagrams of examples of beam steering arrangements.
Figure 3B:
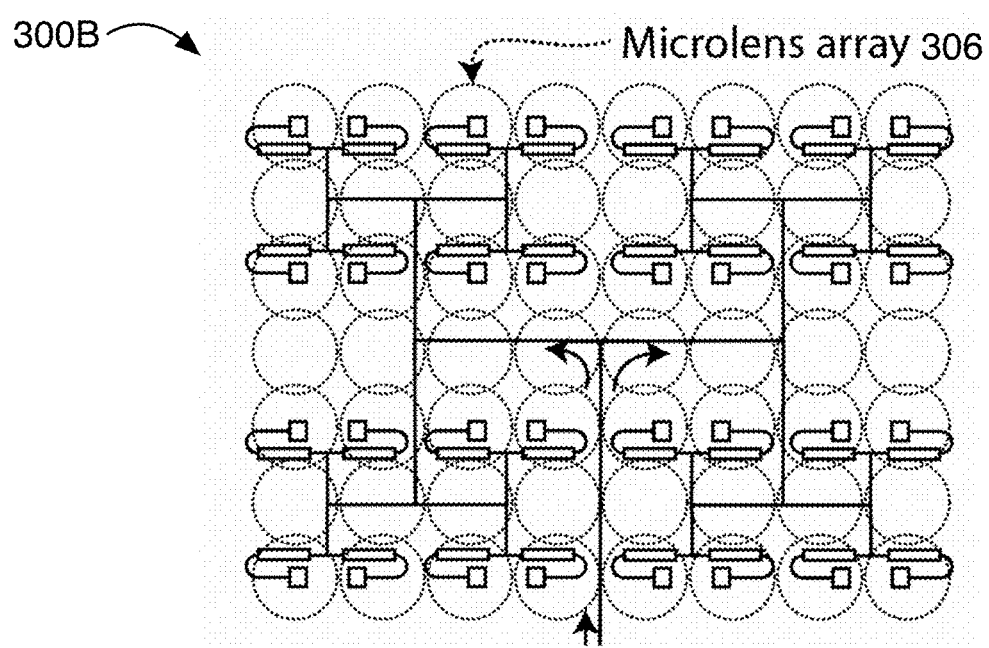

Referring to FIGS. 3A and 3B, other examples of beam steering arrangements use a two-dimensional optical phased array that is able to be steered using phase over both angular dimensions. FIG. 3A shows an arrangement 300A that includes optical emitters 302 distributed over a rectangular shaped area, where light has been distributed to phase shifters 304 coupled to respective ones of the emitters 302. In this example, the light is delivered to the emitters 302 using an "H-tree" shaped splitter network. This phase control can also be performed in a sub-phased array format, which enables fewer input/output (I/O) controls, as described in more detail in U.S. Pat. No. 10,613,410, incorporated herein by reference.

A potential issue that may be encountered in the arrangement 300A is that the emitters 302 may have a spacing from their nearest neighbors that is larger than a particular sub-wavelength pitch (e.g., half of the operating wavelength), which would lead to side lobes in the array emission pattern. One way to mitigate the effect of the side lobes (e.g., reducing the amount of power emitted into the side lobes) is to make the element factor associated with individual emitters more directional. For example, FIG. 3B shows one way to make the individual emitters more directional by positioning a microlens array 306 in proximity to the emitters 302, such that the lenses in the microlens array 306 are approximately spaced at a similar pitch as the emitters 302. In some implementations, the centers of the lenses can be fine-tuned to substantially coincide with the locations of the emitters.

Figure 4A:
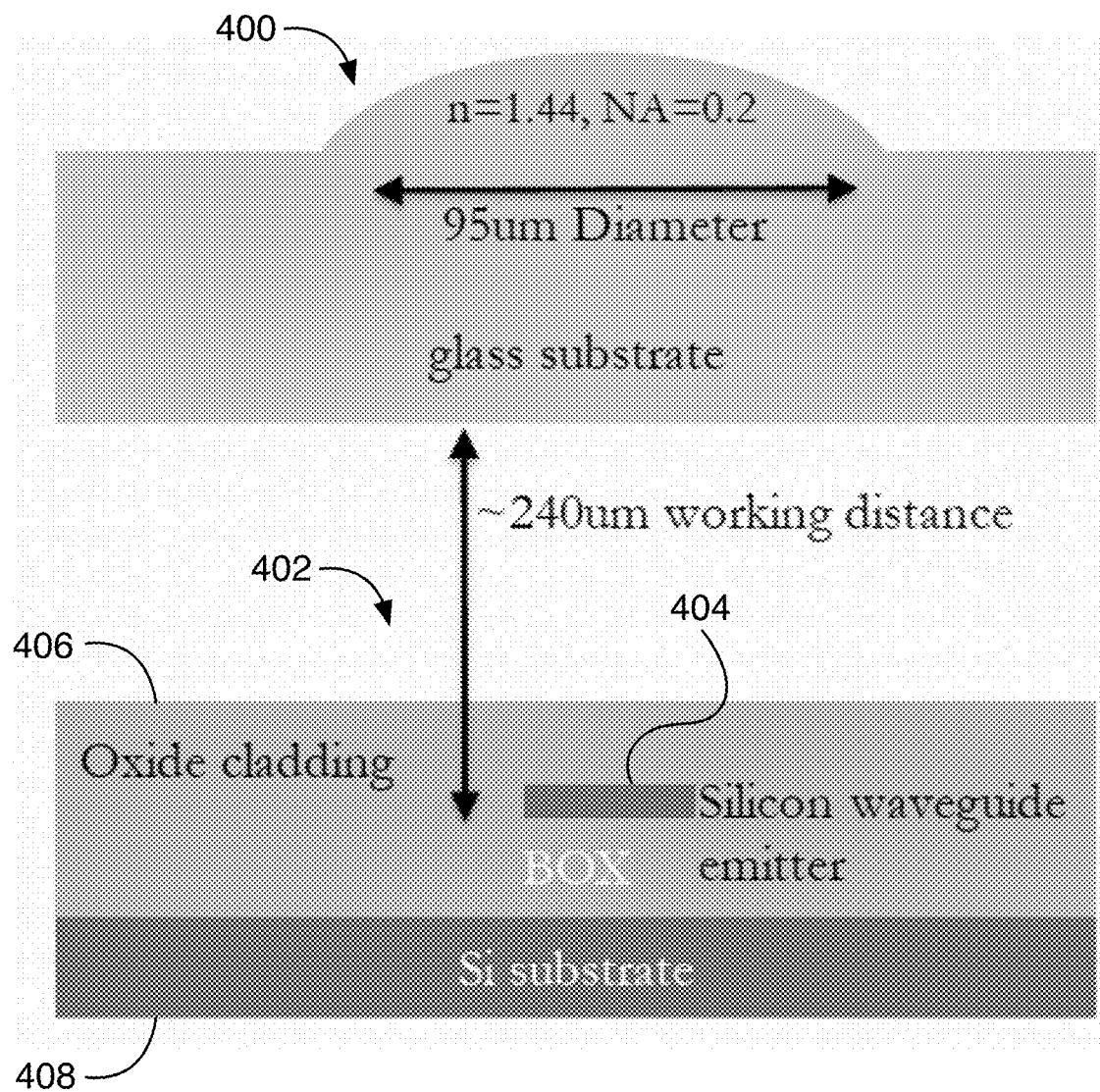
FIGS. 4A and 4B are schematic diagrams of a side view and top view, respectively, of a microlens-emitter arrangement.

FIG. 4 shows, in a side view, an example of a microlens 400 that is able to be positioned over an optical emitter 402.

Figure 4B:
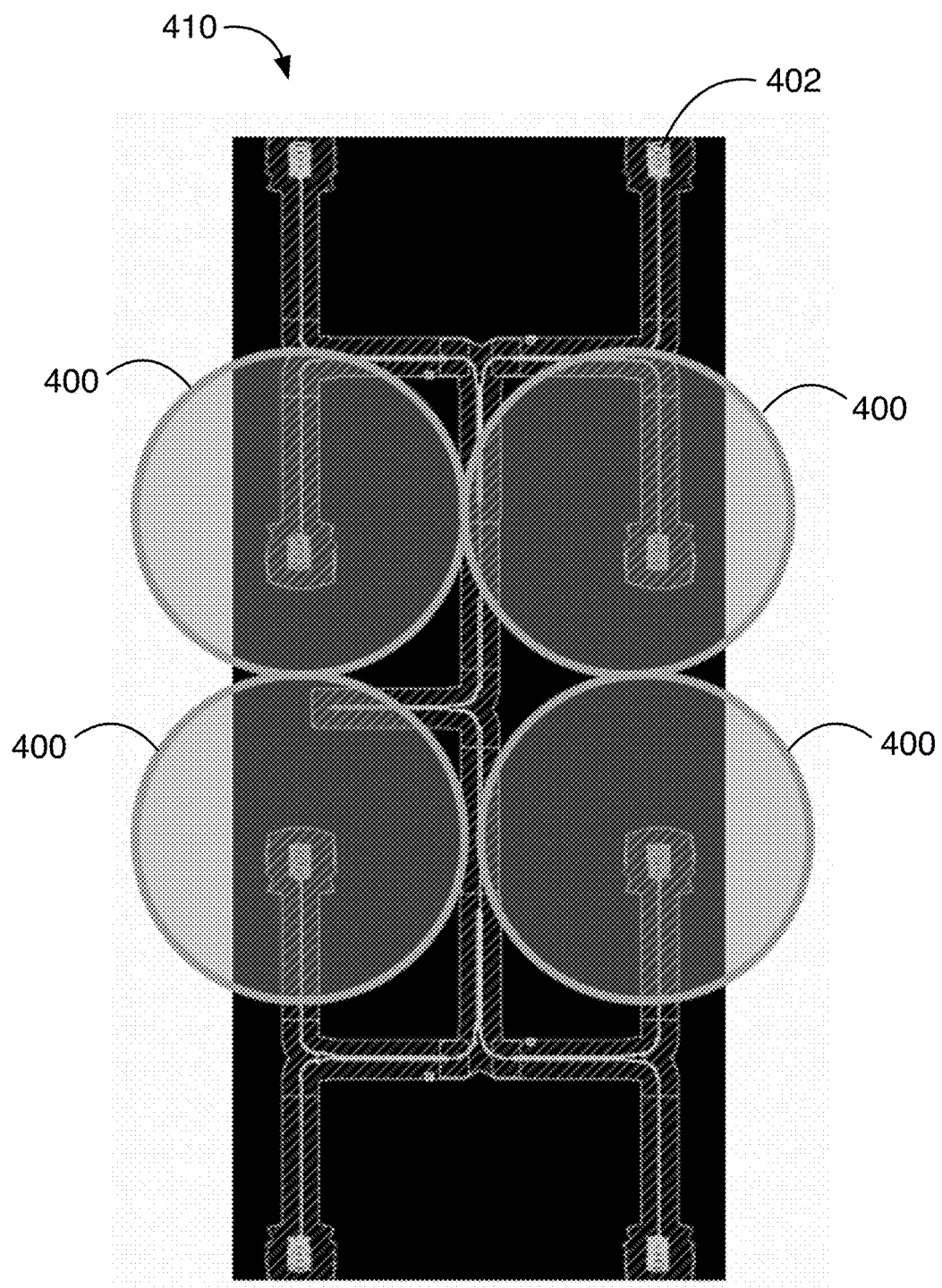

In this example, the microlens 400 is formed within a glass substrate having a refractive index of 1.44, and has a diameter of approximately 95 µm, a radius of curvature of approximately 120 µm, and a numerical aperture (NA) of around 0.2. There is a working distance of approximately 240 µm between the microlens 400 and a silicon waveguide emitter 404. The emitter 404 can be implemented as a waveguide having a grating structure that is embedded within an oxide cladding 406 over a silicon substrate 408 that is fabricated using a silicon-on-insulator (SOI) platform. FIG. 4B shows a top view of an arrangement 410 of microlenses 400 within a microlens array, which are positioned over respective optical emitters 402.

Figure 5:
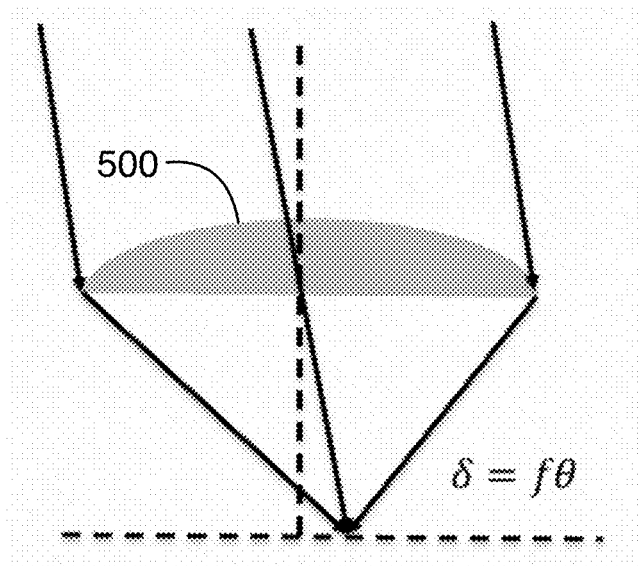
FIG. 5 is a schematic diagram of optical geometry for a lens.

FIG. 5 shows an example of a lens 500 used as a microlens within a microlens array and the resulting optical geometry involved with making an emitting/collecting device more directional in order to provide side-mode suppression. In this example, the lens 500 has a focal length of around 200 µm, and the resulting focused spot size at the focal plane is assumed to be around 8 µm. The field of regard angle is around 1.5 degrees. As the size of the lens (and the resulting numerical aperture) increases, the directionality increases.

Figure 6:
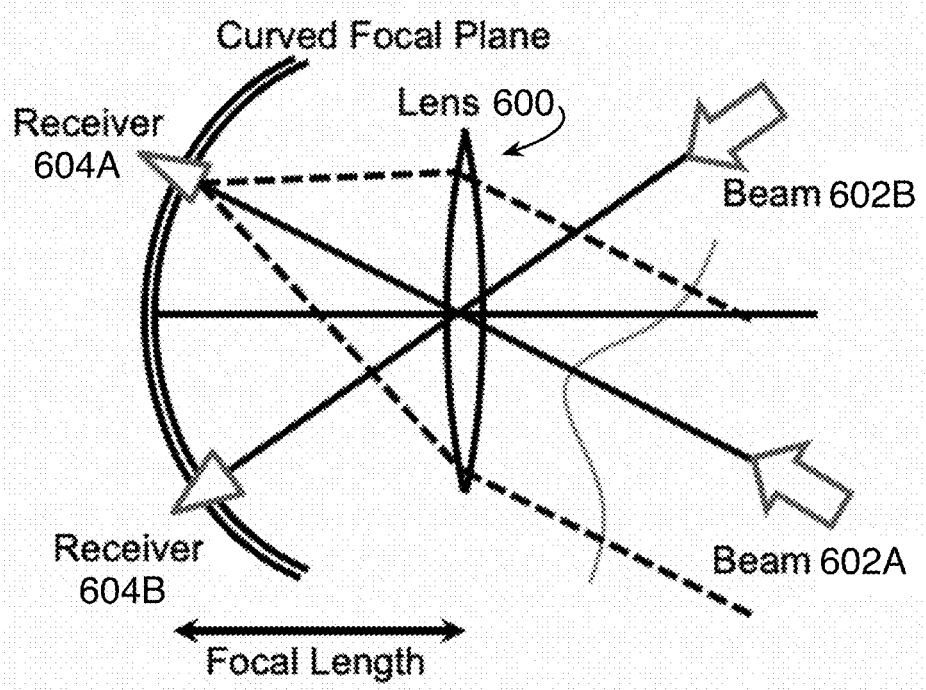
FIG. 6 is a schematic diagram of an optical receiving arrangement.

Referring to FIG. 6, the inclusion of a receiver-side lens in an optical receiving arrangement can potentially lead to the reduction of field of view (or "field of regard" or "collection cone"), for example, if only one receiver (e.g., a photodetector) is used. But, the field of view can be increased with a receiver-side lens 600 using multiple receivers appropriately arranged over a focal surface. If the direction of an incoming plane wave is changed (e.g., from an incoming beam 602A to an incoming beam 602B), the focusing point of a corresponding receiver moves on a hemispherical focal surface (e.g., from receiver 602A to receiver 602B). Such a hemispherical arrangement of receivers would allow for light to be received over a relatively large spatial cone. Alternatively, if there were only a single receiver placed at the center of the lens axis, light would be received from a more limited spatial cone.

Figure 8:
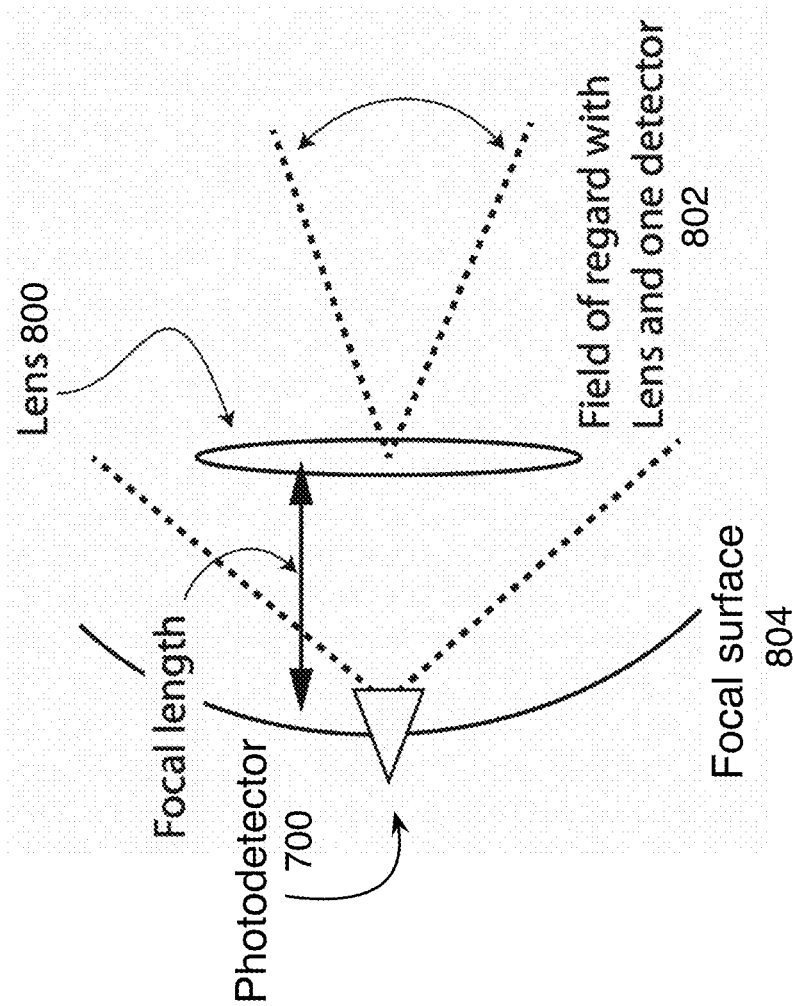
FIG. 8 is a schematic diagram of an optical receiving arrangement.
Figure 7:
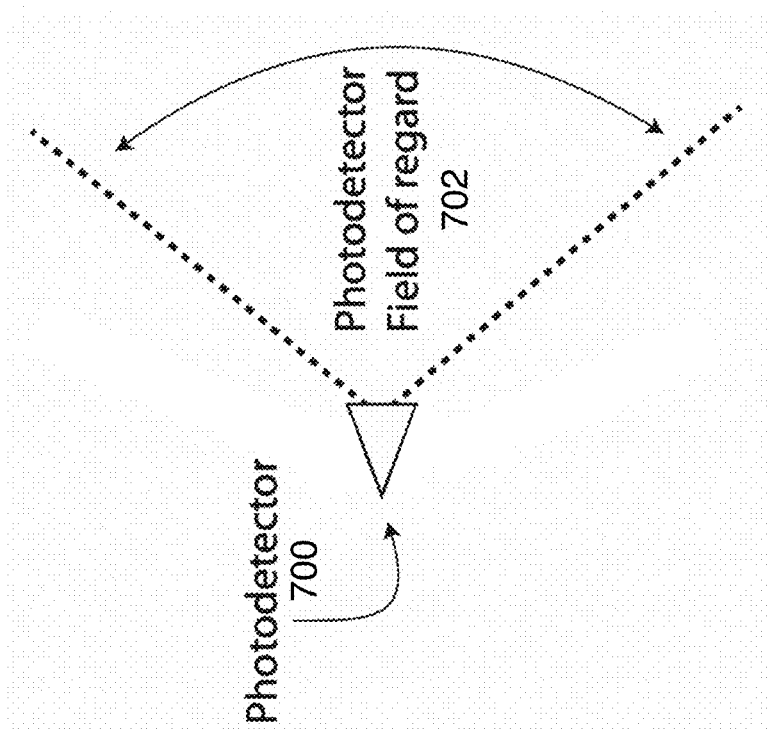
FIG. 7 is a schematic diagram of an optical receiving arrangement.
Figure 9:
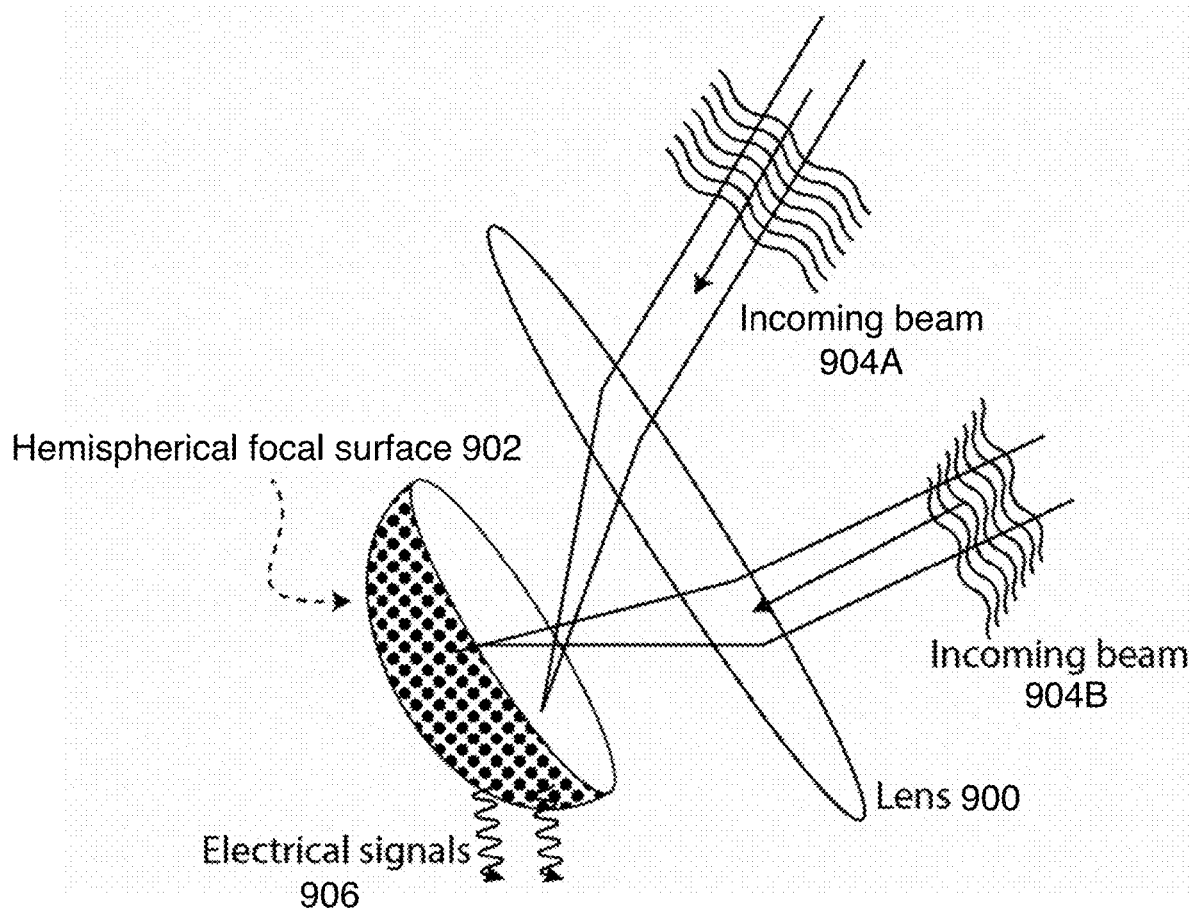
FIG. 9 is a schematic diagram of an optical receiving arrangement.

FIGS. 7 and 8 show different optical receiving arrangements without and with a receiver-side lens, respectively. Referring to FIG. 7, when there is no receiver-side lens in the receiving arrangement, a photodetector 700 has a field of regard 702 that depends on the acceptance angle and refractive index of the photodetector 700. Referring to FIG. 8, when there is a lens 800 in the receiving arrangement, a secondary factor further restricts the arrangement to a narrower field of regard 802. In particular, as explained above, there is an associated movement of the focal point on the focal surface 804 that is associated with the lens 800 when the angle of the incoming beam changes. FIG. 9 shows an optical receiving arrangement in which there is a lens 900 and an array of multiple photodetectors placed on a hemispherical focal surface 902, which are able to receive focused spots from different incoming beams 904A and 904B arriving at different angles. For example, the position and/or angle of the incoming beam may drift due to effects of atmospheric propagation. The electrical signals 906 from the different photodetectors correspond to different pixels having different intensities in received images, which may vary during operation of the FSO link as the beam drifts.

Figure 10:
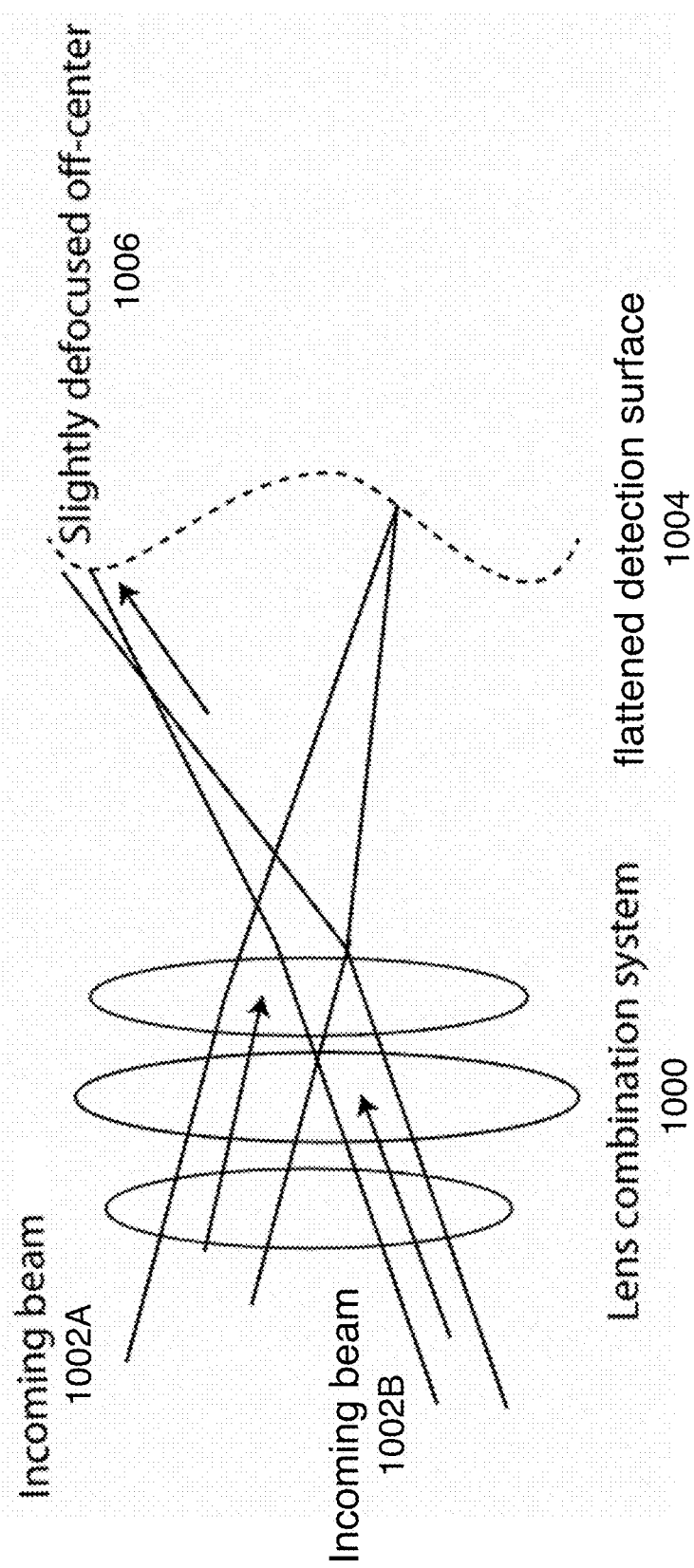
FIG. 10 is a schematic diagram of an optical receiving arrangement.

Referring to FIG. 10, in some optical receiving arrangements a lens combination system 1000 includes multiple lenses, or multiple components of a compound lens, with different shapes and/or focal lengths, arranged to receive an incoming beam arriving from different angles (e.g., an incoming beam 1002A or an incoming beam 1002B). As an alternative to hemispherical focal surface associated with a single lens, the lens combination system 1000 is able to provide a flattened focal surface that more closely matches a desired flattened detection surface 1004. In some implementations of a detector array, the flattened focal plane 1004 may be a more suitable arrangement for distributing photodetector and/or other components of the detector modules of the detector array. In such an optical receiving arrangement, a beam being received through an off-center entrance path may be deliberately defocused at a particular portion of the detection surface 1004, as shown at the edge location 1006 that is slightly defocused.

Figure 11A:
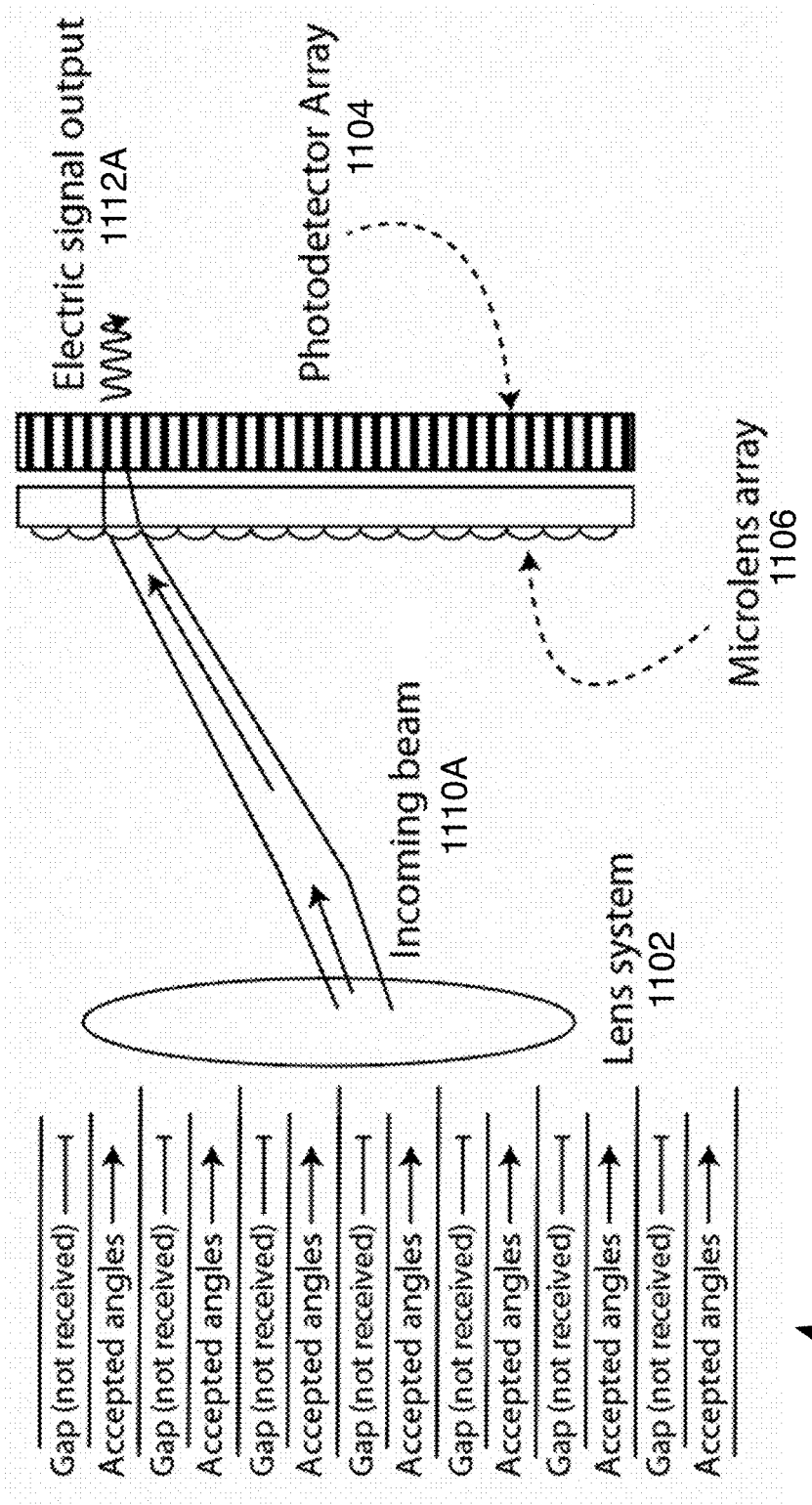
FIGS. 11A and 11B are schematic diagrams of optical receiving arrangements.
Figure 11B:
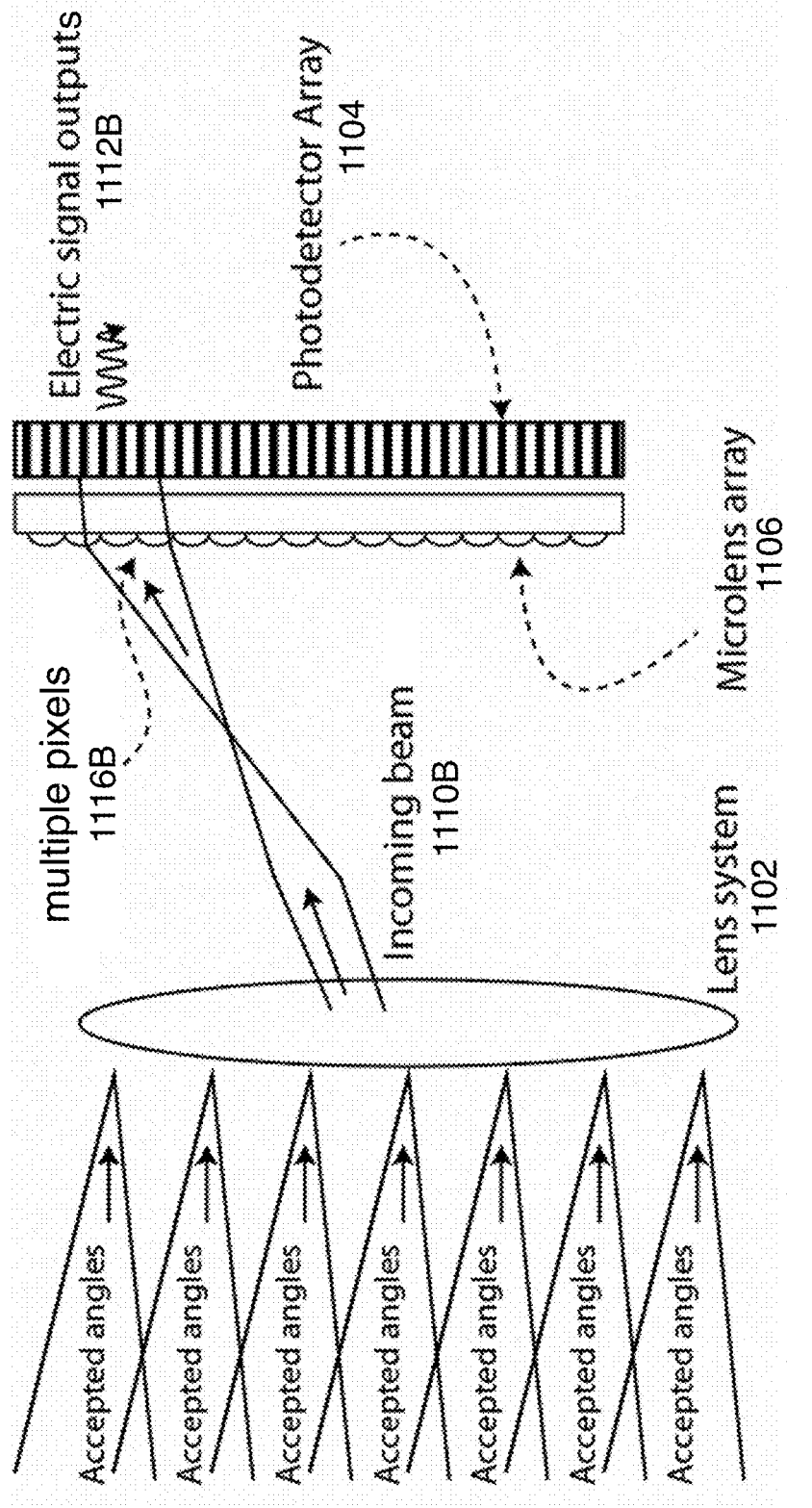

Optical receiving arrangements of FIGS. 11A and 11B further illustrate how a deliberate defocusing can have positive consequences in some implementations. Referring to FIG. 11A, a lens system 1102 (e.g., a system of one or more lenses) maps respective focal spots for different pixels corresponding to different photodetectors of a photodetector array 1104, and different microlenses of a microlens array 1106, to different incoming accepted angles and positions in field of view 1108. In this example, in which the spot sizes are relatively tight (approximately a single pixel wide), the light is collected very efficiently for some accepted angles/positions. For example, an incoming beam 1110A is focused onto one of the pixels to generate an electrical signal output 1112A from that pixel. But, at other angles/positions there is a gap in the field of view 1108 where the light may fall between pixels yielding little or no electrical signal (i.e., not received).

Figure 12:
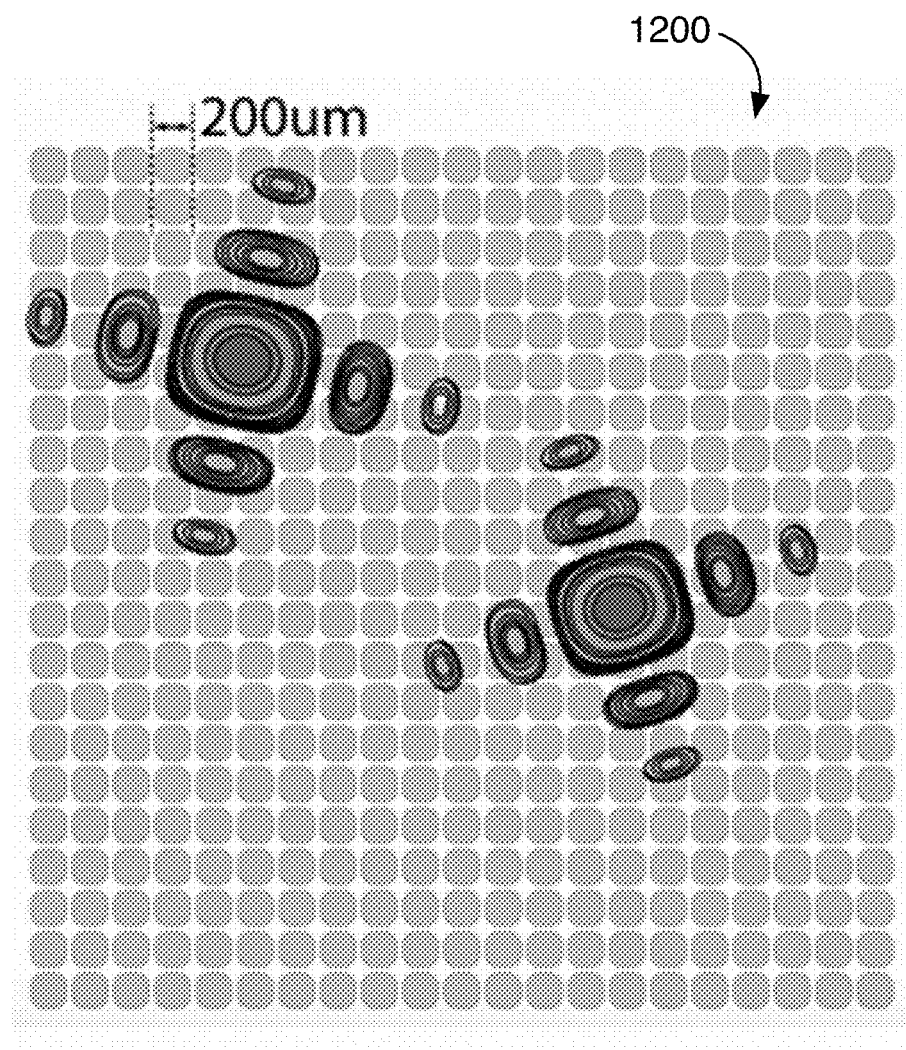
FIG. 12 is an illustration of received intensity patterns on a detector array.

The gaps in the accepted angles/positions can be reduced or eliminated by having a spot size that is larger than the pixel size and/or by having a small amount of defocus in the beam as collected by the microlens array 1106. Referring to FIG. 11B, a field of view 1114 includes overlapping cones of accepted angles, each mapping to multiple pixels. For example, an incoming beam 110B is focused onto multiple pixels 1116B to generate electrical signal outputs 1112B from those pixels 1116B. The effect of defocusing can also be seen in the example of FIG. 12, in which focused intensity patterns are shown on pixels of a 21×21 pixel detector array 1200 having a pixel size of around 200 µm. This example shows intensity patterns for two different possible beam trajectories of a beam transmitted from a square shaped transmitter-side aperture. Alternatively, the two different intensity patterns could correspond to multiple beams received at the same time, as described in more detail below. In this example, the square shape of the transmitter-side aperture and the finite emitter spacing of a transmitter-side OPA has led to an intensity pattern for each focal spot that has a main lobe in the center that covers more than one pixel and multiple side lobes along two orthogonal dimensions on either side of the main lobe.

Figure 13:
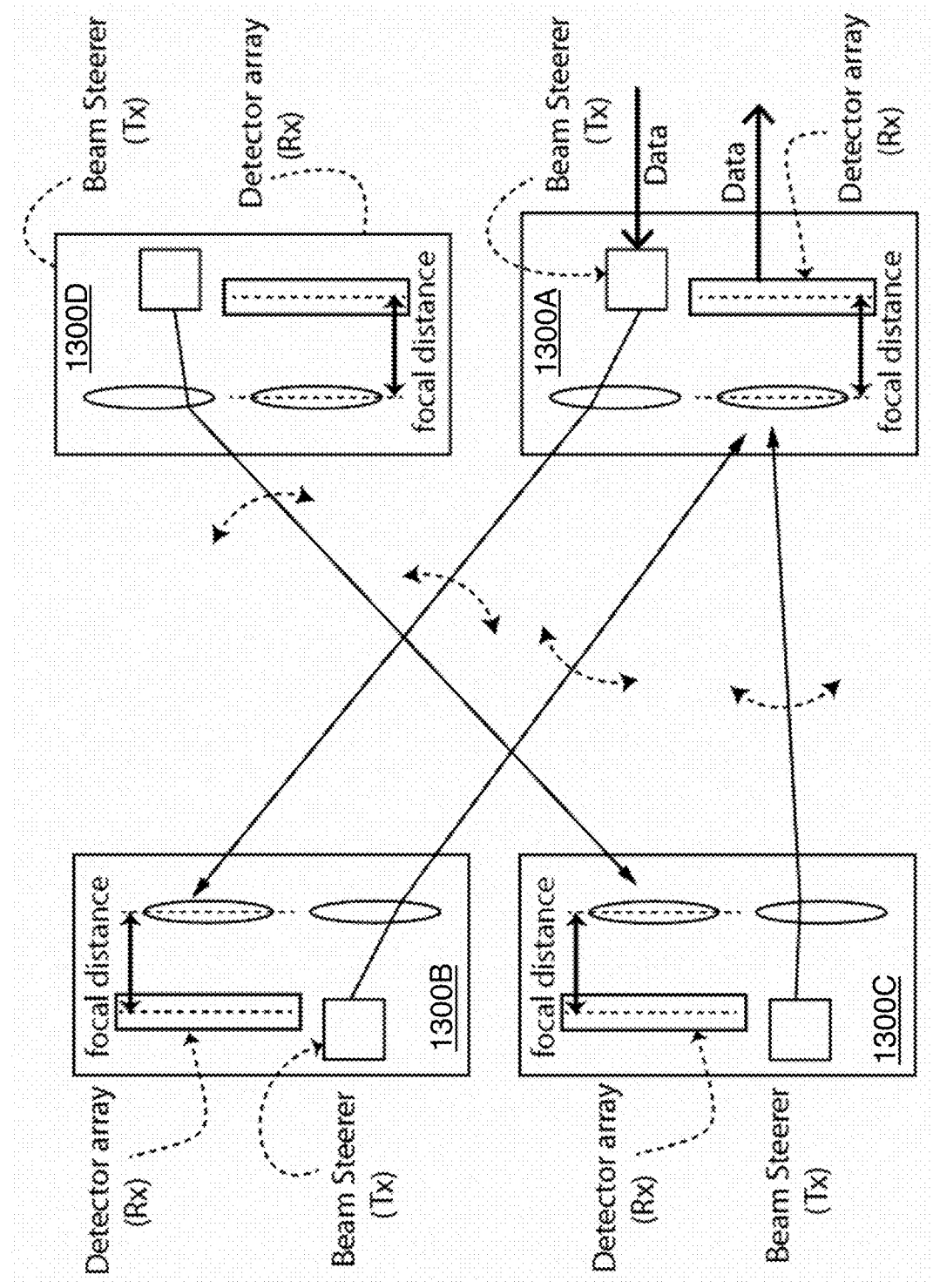
FIG. 13 is a schematic diagram of a multi-beam FSO communication system.
Figure 14B:
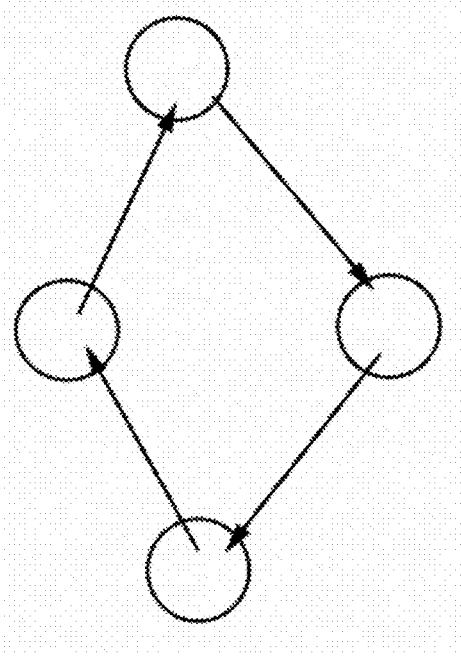
FIGS. 14A-14D are schematic diagrams of mesh network configurations.
Figure 14D:
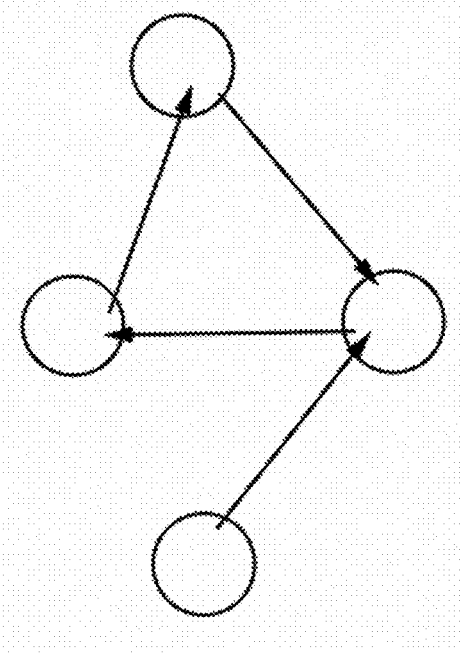
Figure 14A:
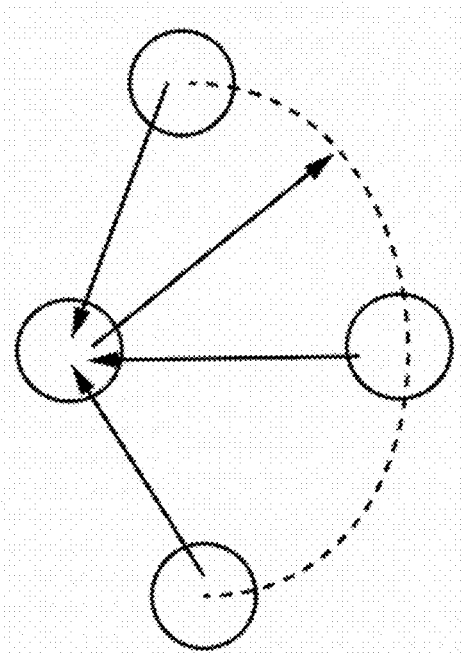
Figure 14C:
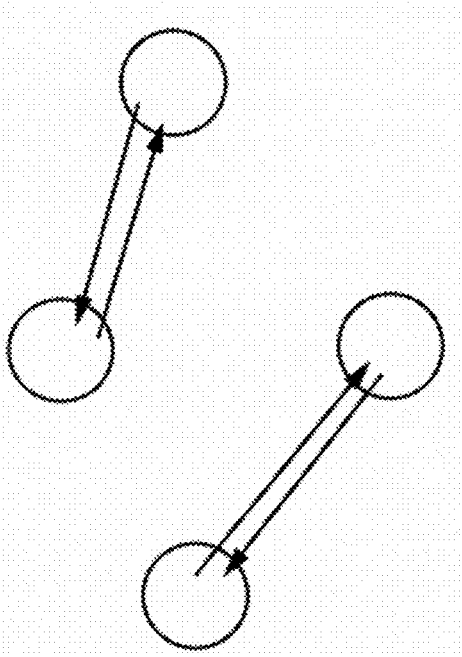

If the electric signal outputs from multiple individual pixels are collected at the same time, then more than one data stream can be concurrently received from one detector array. FIG. 13 shows a multi-beam FSO communication system in which four communication nodes 1300A, 1300B, 1300C, and 1300D are configured to communicate with each other. The node 1300A is receiving beams from multiple nodes 1300B and 1300C at the same time in this example. Generally, any number of communication nodes can be arranged to communicate in a mesh network in which each communication node can be sending and receiving data from any other communication node. In this example, each communication node has a single transmitter-side port but multiple receiver-side ports corresponding to the multiple intensity patterns that can be detected on a detector array at the same time. So, a variety of mech network configurations are possible, as shown in FIGS. 14A-14D, in which the arrows indicate transmission of data via an FSO link between different communication nodes (represented by circles). In other examples, each communication node can include multiple transmitter-side ports by sending multiple beams from multiple transmitter-side apertures, for example, leading to mesh network configurations that are potentially more complex and flexible.

Figure 15A:
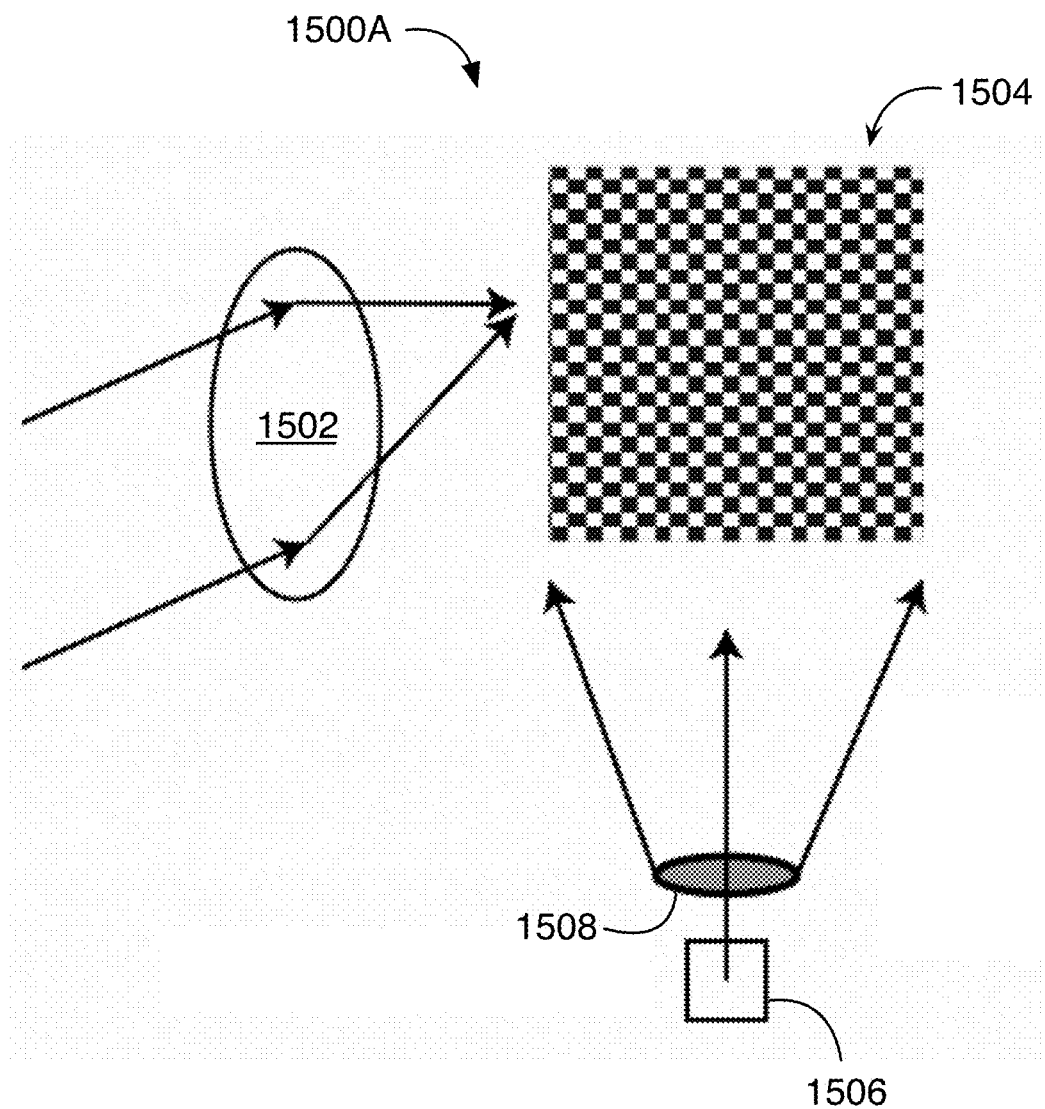
FIGS. 15A and 15B are schematic diagrams of coherent detection configurations.
Figure 15B:
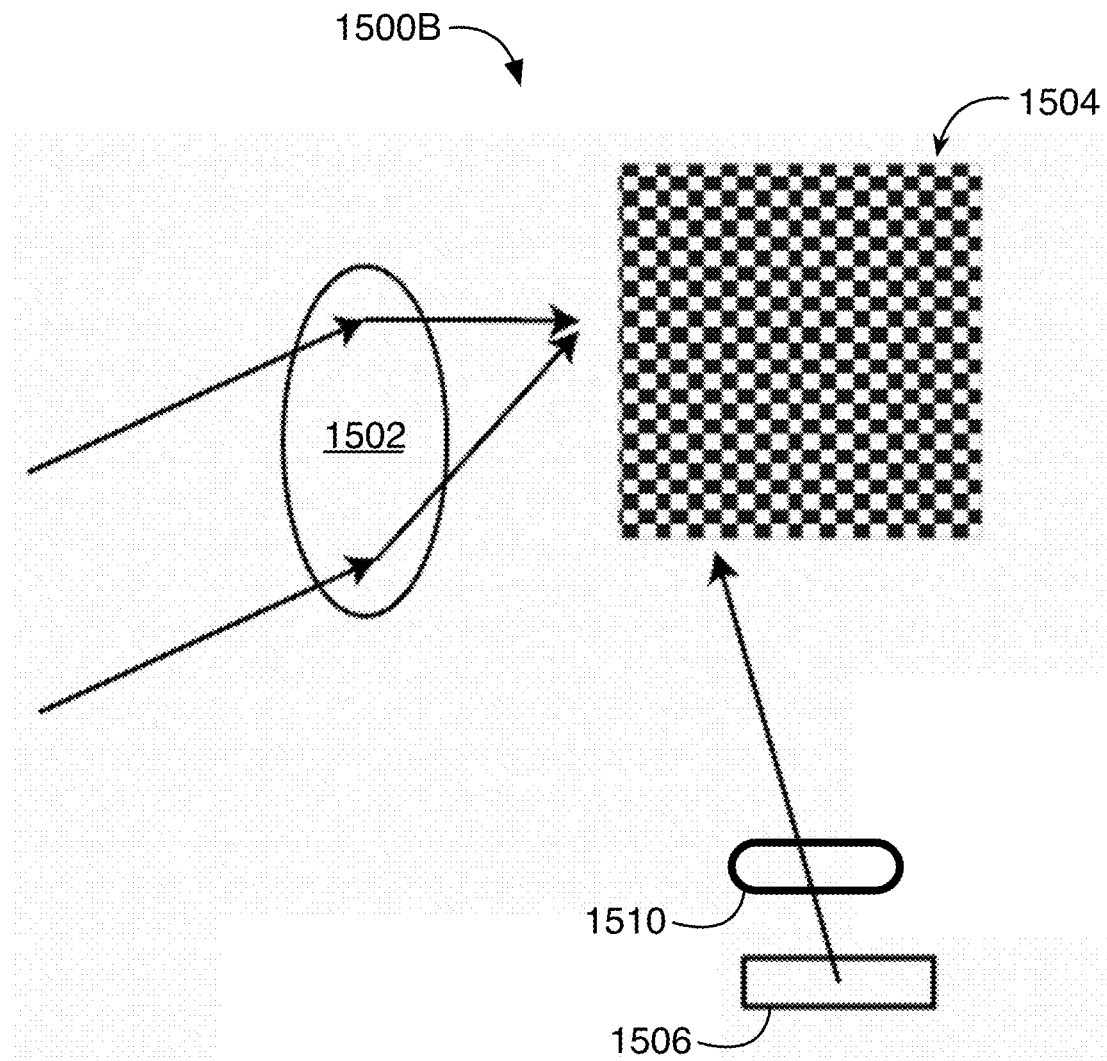
Figure 16:
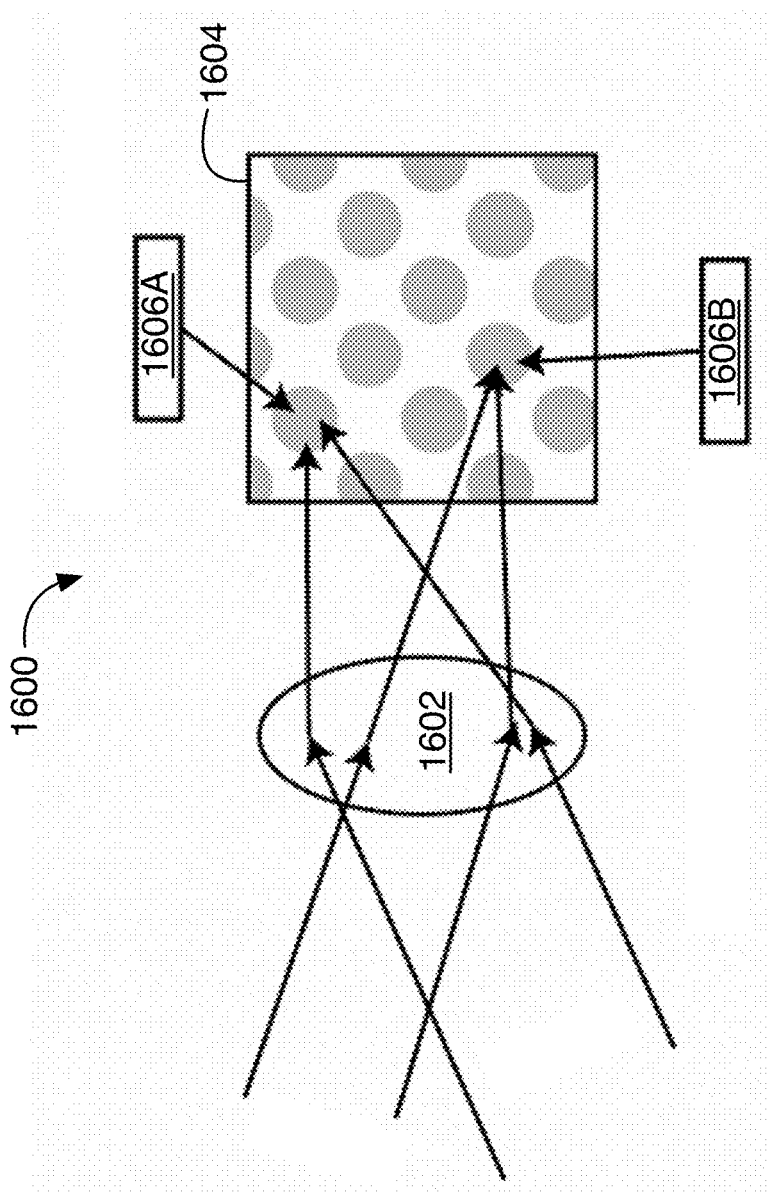
FIG. 16 is a schematic diagram of a coherent detection configuration.

Another possible features that can be included in some implementations of a communication system using FSO links described herein include modulation techniques other than intensity modulation with binary bits. For example, if a receiver circuit includes linear amplifiers and nonbinary decision circuits, it is possible to transfer more information utilizing a PAM4 or higher order amplitude modulation. Moreover, if a coherent local oscillator (LO) (e.g., light from a laser) is utilized, it is possible to use coherent detection with phase modulation. Utilizing a coherent detection scheme can complicate the receiver circuit but can also significantly boost the sensitivity of the system for long-range communication links in which very few photons might reach the receiver. FIG. 15A shows an example of a uniform illumination configuration 1500A in which a receiver-side lens 1502 focuses incoming light onto a detector array 1504 and an LO laser 1506 and lens 1508 are used to uniformly illuminate the detector array 1504. In some implementations, the initial uniform illumination configuration 1500A is used initially to locate a signal from a beam, and then a directed illumination configuration 1500B is used with the LO beam focused more tightly and steered to a portion of the detector array 1504. For example, an LO control system 1510 can include a fast feedback loop to control the LO spot size and dynamically steer the LO beam. The LO laser 1506 can be locked to a transmission laser at a remote node and a hybrid reception circuit is able to extract the phase of the modulated light. FIG. 16 shows an example coherent detection configuration 1600 that includes a receiver-side lens 1602 to focus light from multiple received beams onto a detector array 1604. In this example, there are multiple LO sources 1606A and 1606B to provide a separate coherent LO beam for interfering with each of two different received beams concurrently. In this way, any number of independent LO sources can be used to implement a multi-channel receiver.

Figure 17:
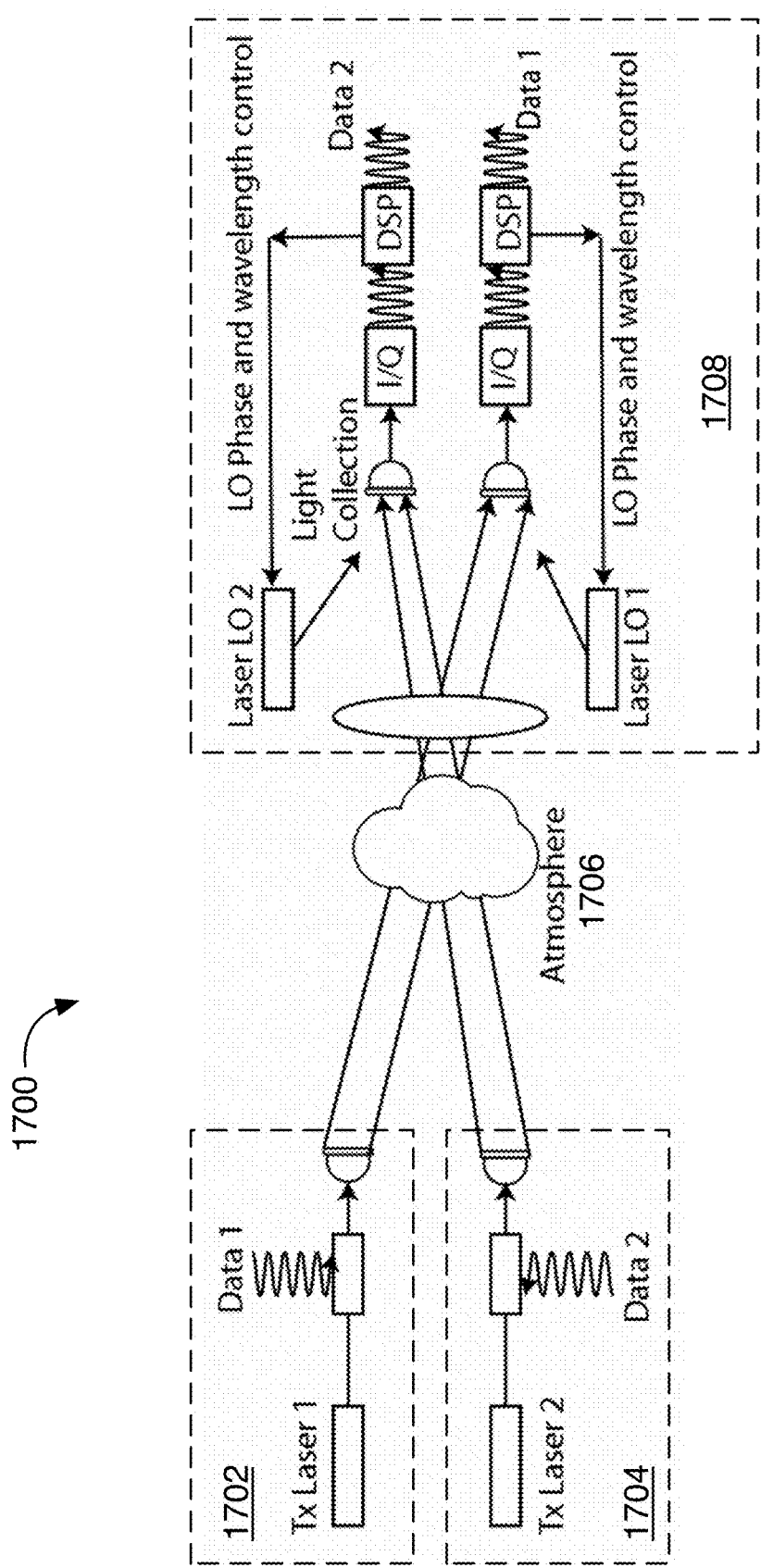
FIG. 17 is a schematic diagram of a multi-channel coherent FSO communication system.

FIG. 17 shows an example configuration of a multi-channel coherent FSO communication system 1700. There is a node 1702 that includes a Tx Laser 1 and a node 1704 that includes Tx Laser 2, which provide optical waves modulated with respective data streams Data 1 and Data 2. These optical waves are emitted as separate optical beams that propagate through the atmosphere 1706 to be received by a node 1708. In this example, light collection is shown for two detector modules in an array of multiple detector modules. A Laser LO1 and Laser LO2 provide separate LO beams directed to the individual detector modules for detection of in-phase and quadrature-phase (I/Q) components of a coherently detected signal, which is provided to digital signal processing (DSP) circuitry for demodulating the data streams Data 1 and Data 2.

Figure 18:
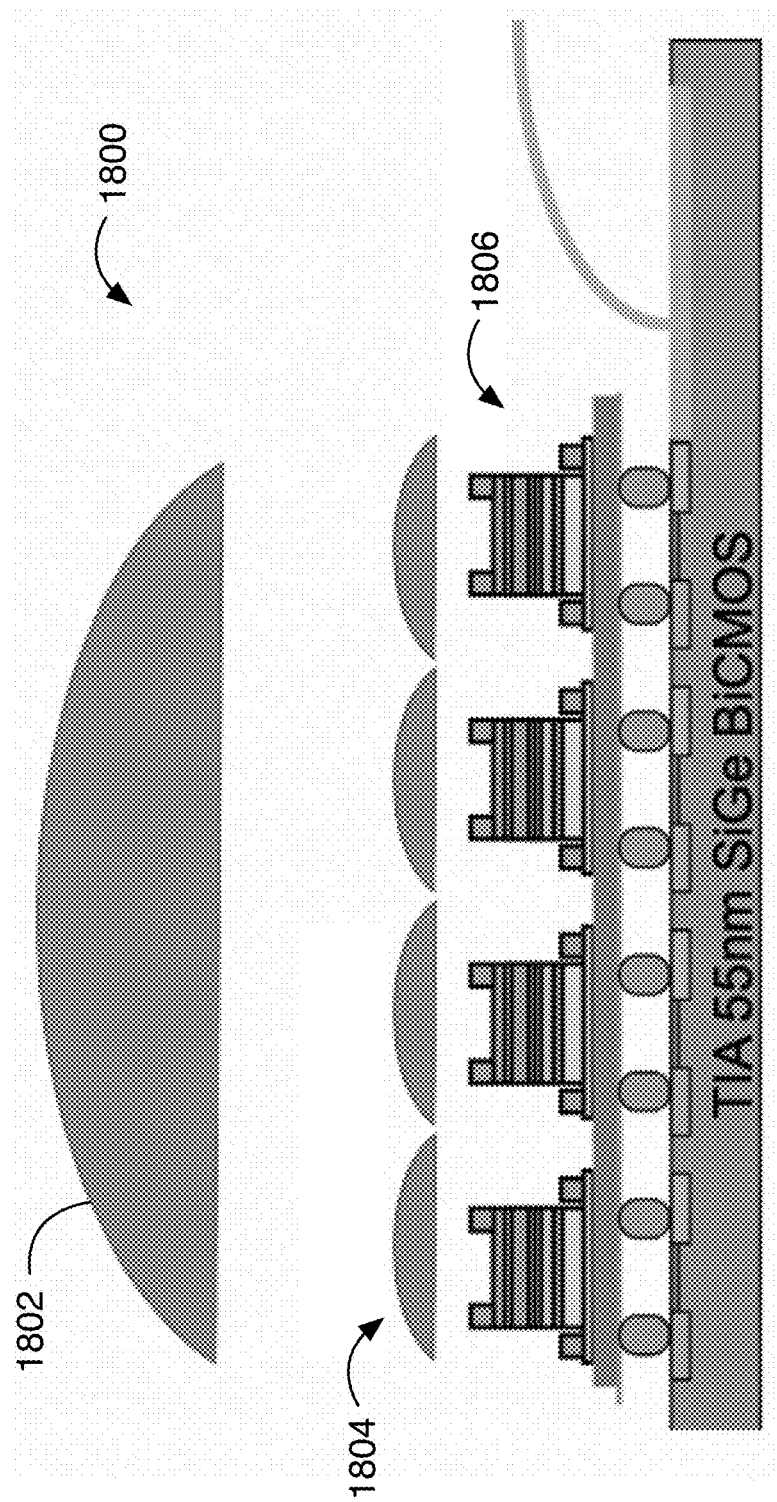
FIG. 18 is a schematic diagram of an example detection arrangement.
Figure 19:
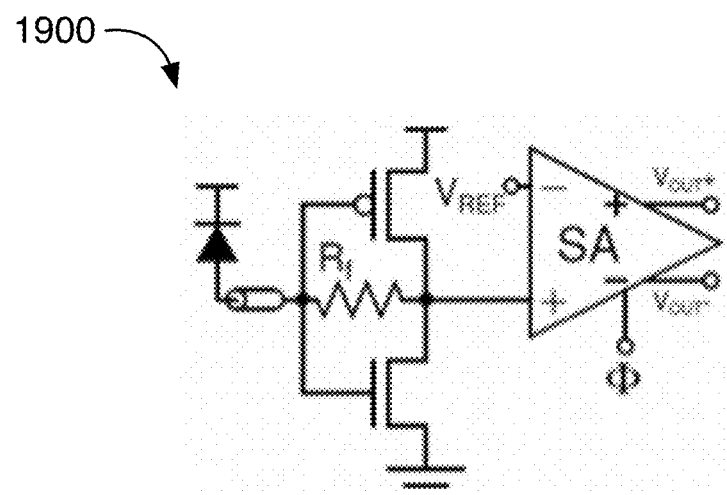
FIG. 19 is a circuit diagram of an example readout circuit.
Figure 20:
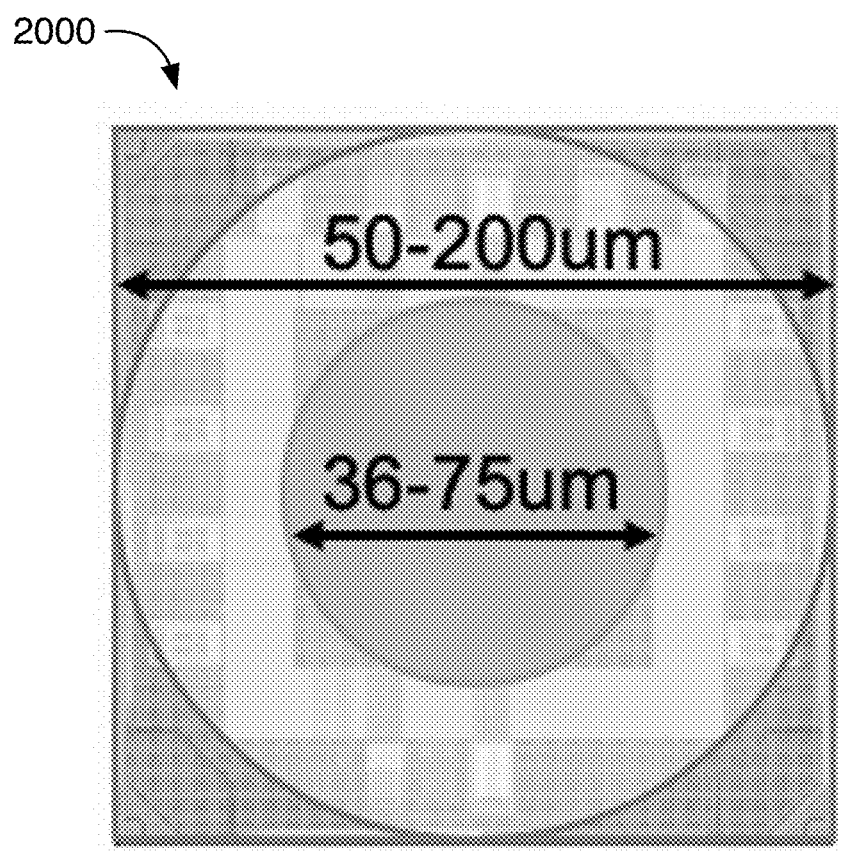
FIG. 20 is a schematic diagram of an example detector module geometry.

In implementations in which there is a relatively large number of detector modules in the system, it is useful to be able to process the received data streams and read the incoming data without inducing excessive noise, parasitics, and/or loss in the potentially weak signals. FIG. 18 shows an example of a detection arrangement 1800 that includes a receiver-side lens 1802 and a microlens array 1804 arranged in front of a detector array 1806 of detector modules that each includes readout circuitry on an integrated SiGe BiCMOS platform that provides a transimpedance amplifier (TIA) for each detector module. When a TIA is placed directly beneath a corresponding avalanche photodiode (APD) photodetector, the APD can provide an initial gain (e.g., between around 10 to 1000) and feed the resulting photocurrent to a TIA gain stage. The TIA power consumption is relatively low (e.g., less than about 1 mW per pixel for TIA amplification of 1 µA to 0.8 Vpp). A low noise TIA, with the bandwidth suited to the data rate, is able to provide a voltage signal output that can be amplified by a low noise amplifier (e.g., noise less than around 3 pA/$\sqrt{Hz}$), fed to a limiting amplifier, and digitized. FIG. 19 shows one possible implementation of a readout circuit 1900. FIG. 20 shows an example detector module 2000 with exemplary dimensions for an individual pixel. There is an APD with an active area with a diameter of around 36 to 75 µm. There is an arrangement of associated circuitry around the APD having an area with a diameter of around 50 to 200 µm. The total number of pixels in an overall detector area of around 4 cm$^2$ can be around 10,000 to 160,000, for example, or with a larger detector area there can be millions of pixels.

Figure 21:
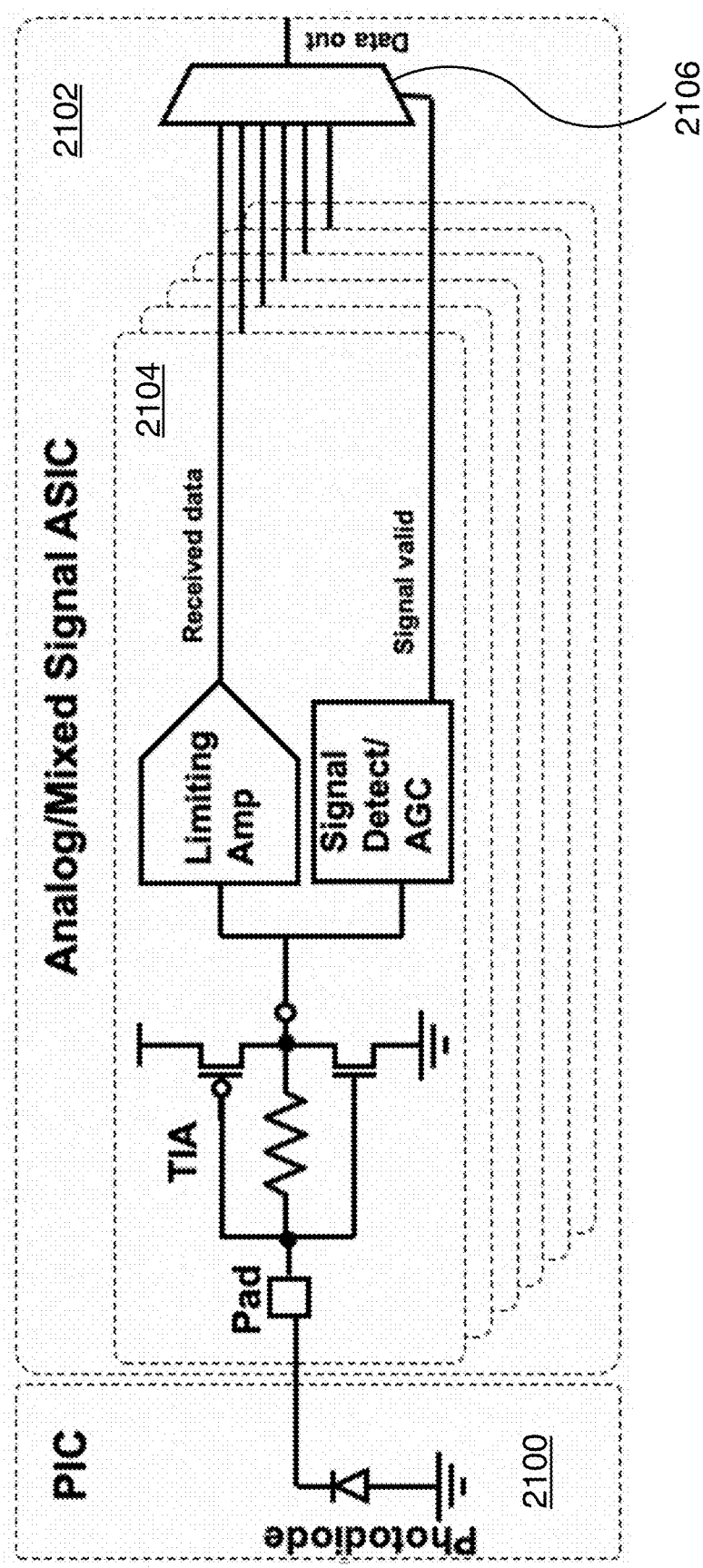
FIG. 21 is a schematic diagram of an example detector module circuitry.

In some implementations, the TIAs and other supporting circuitry for a given APD can be turned off or placed into a low power (or "hibernation") mode in order to save power. FIG. 21 shows an example of circuitry for a detector module. In this example, there is photodiode 2100 (e.g., an APD) representing one pixel of on array of photodiodes fabricated on a photonic integrated circuit (PIC). A signal processing circuitry 2102, for example implemented as an analog/mixed signal application specific integrated circuit (ASIC), includes pixel circuitry 2104 for individual pixels, and a controller 2106 (e.g., including a multiplexor or other selection circuitry) that is able to select received data for selected pixels based on signal valid information. The pixel circuitry 2104 includes a TIA, a limiting amplifier, and a signal detection/automatic gain control circuit module to reduce bit errors, which together enable detection of a data signal. Using the pixel circuitry 2104 and the controller 2106, the signal processing circuitry 2102 is configured to monitor the photocurrent from the photodiode 2100 and as soon as the current in a predetermined spectral domain (e.g., a spectral domain for an expected modulated data signal) goes above a predetermined threshold the TIA and other circuitry can be activated. This selective activation reduces the overall power consumption and local heat generation of the detector array.

Figure 22:
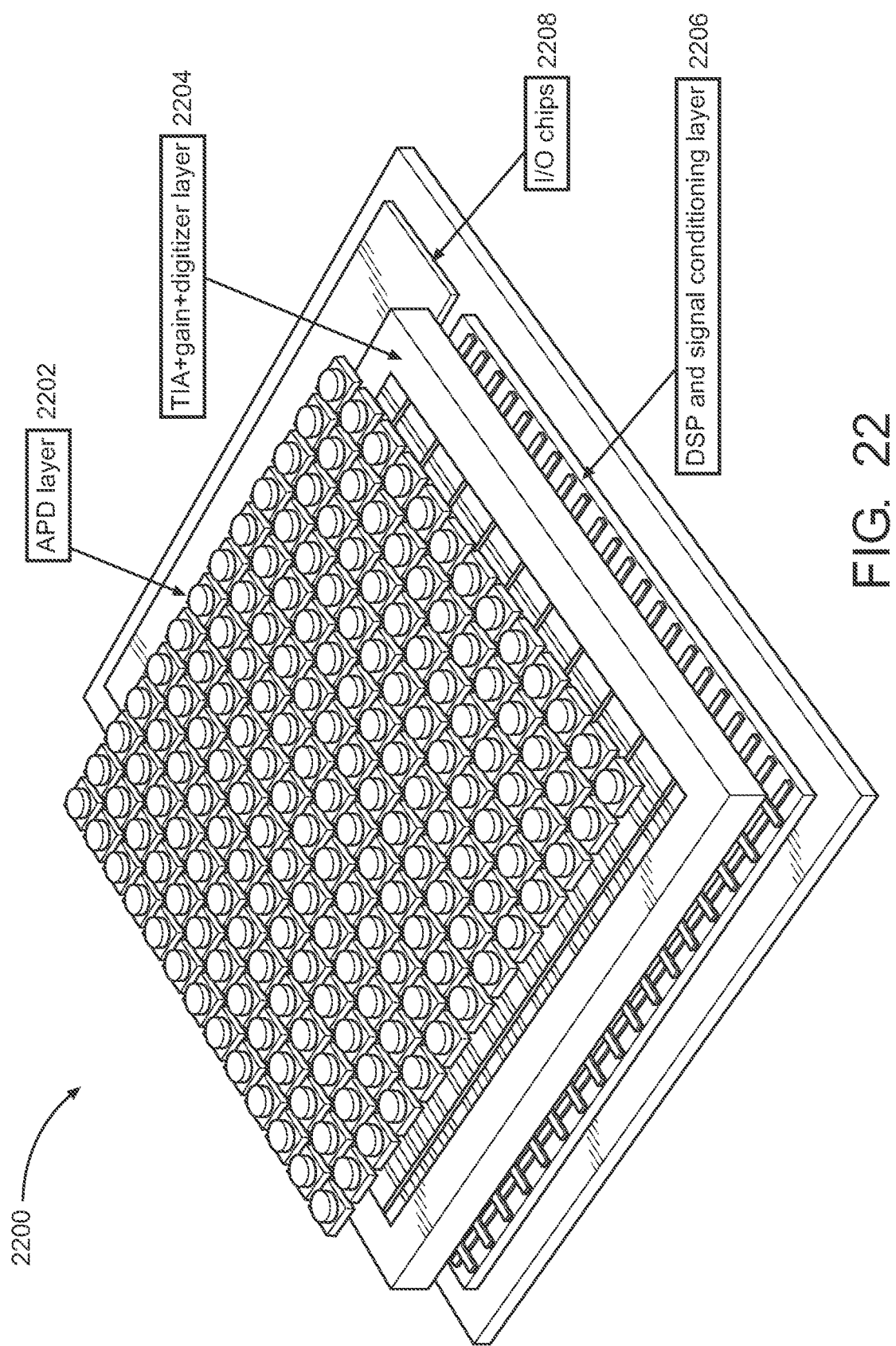
FIG. 22 is an illustration of an example detector array arrangement.
Figure 23:
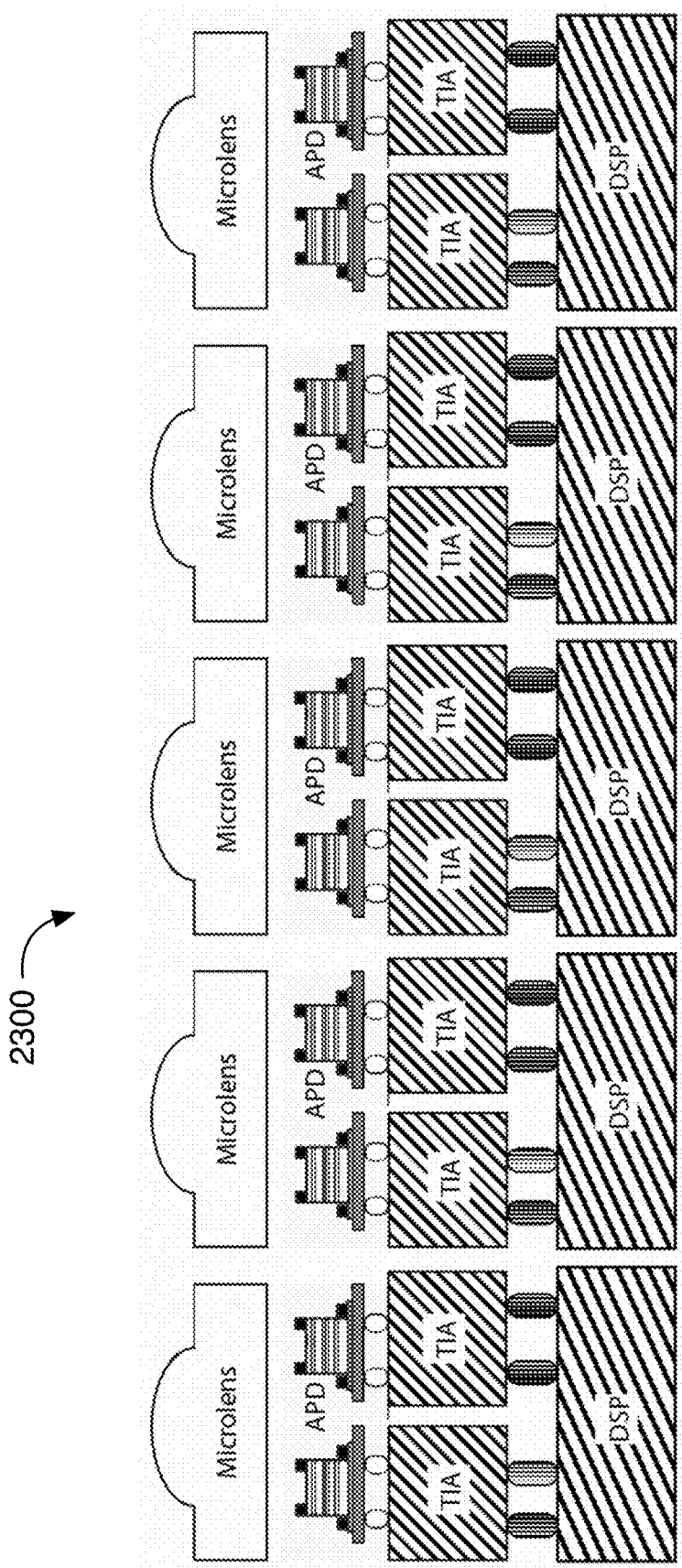
FIG. 23 is a schematic diagram of an example detector array arrangement.

In some implementations, the electronic array of amplifiers and other circuitry is placed in relatively close proximity to the photodetector array to reduce noise and capacitance. FIG. 22 shows an example of a detector array 2200 that includes an arrangement of various layers in a compact configuration. An APD layer 2202 includes APDs that collect incoming light. A middle layer 2204 includes an array of TIAs, gain circuits, and digitizer circuits. The middle layer 2204 can be fabricated in the same die as the APD layer 2202, or can be connected to a die containing the APD layer 2202 using 3D integration, for example. A back layer 2206 includes additional DSP and signal conditioning circuitry, so that each pixel can have signal processing capabilities. One or more I/O chips 2208 along one or more edges of the back layer 2206 are used to receive signals from a group of pixels corresponding to a particular received beam. In some examples, individual elements can be shared by multiple pixels. For example, FIG. 23 shows an example detector array arrangement 2300 in which there are multiple APDs for each microlens, each APD has its own TIA, and there is a single DSP element for multiple neighboring TIAs. A variety of other arrangements are also possible, including arrangements in which each pixel has the same set of elements.

Figure 24:
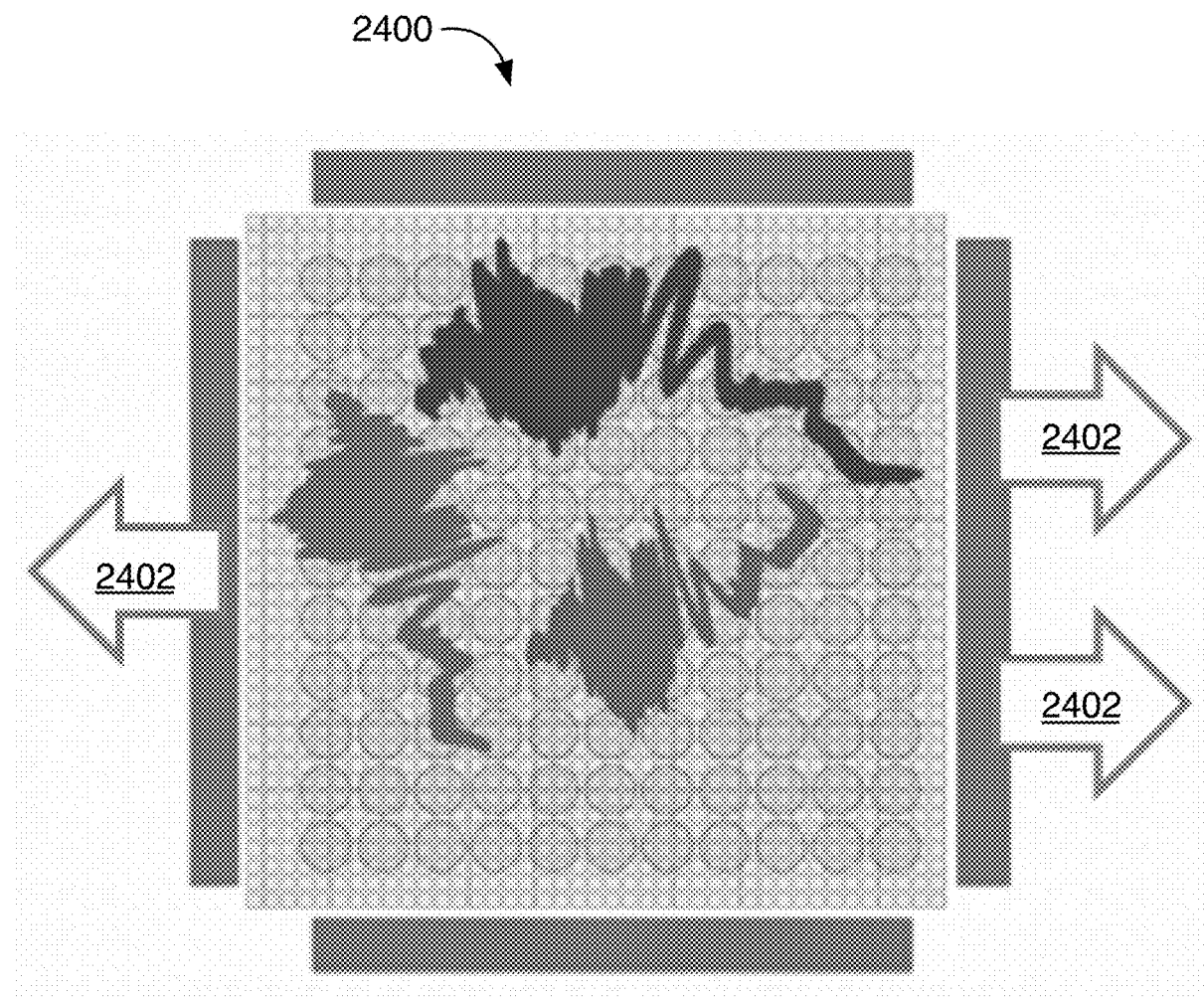
FIG. 24 is a schematic diagram of an example of optical intensity patterns for different received beams.

FIG. 24 shows an example in which three different beams are received by a detector array 2400. Due to atmospheric effects, vibrations of the platform that supports the receiver-side and/or transmitter-side optical elements, and/or relative movement of the nodes (such as a drone communicating with a plane or telecommunication between two satellites), the focal spots on the detector array 2400 may move. The resulting intensity patterns for movement of the focal spots over a given period of time are shown in FIG. 24. For example, the faster a platform moves, the quicker a beam's focal spot moves over different pixels. Therefore, in order to achieve continuous data transmission without a lapse, the pixel or pixels responsible for collecting data should be seamlessly transferred as the focal spot moves. This can be achieved using a circuit configured with a fast feedback loop that is able to detect the pixels that are receiving a high enough signal, and to track the movement of the focal spot. In some implementations, the circuit is also configured to predict the next pixels that should be ready for collecting the data. This can be implemented, for example, by appropriate control of the analog gain circuitry, and circuitry in the digital layer configured to control the throughput of the I/O array that is coupled to I/O ports 2402 for streaming data associated with different tracked beams.

Figure 25:
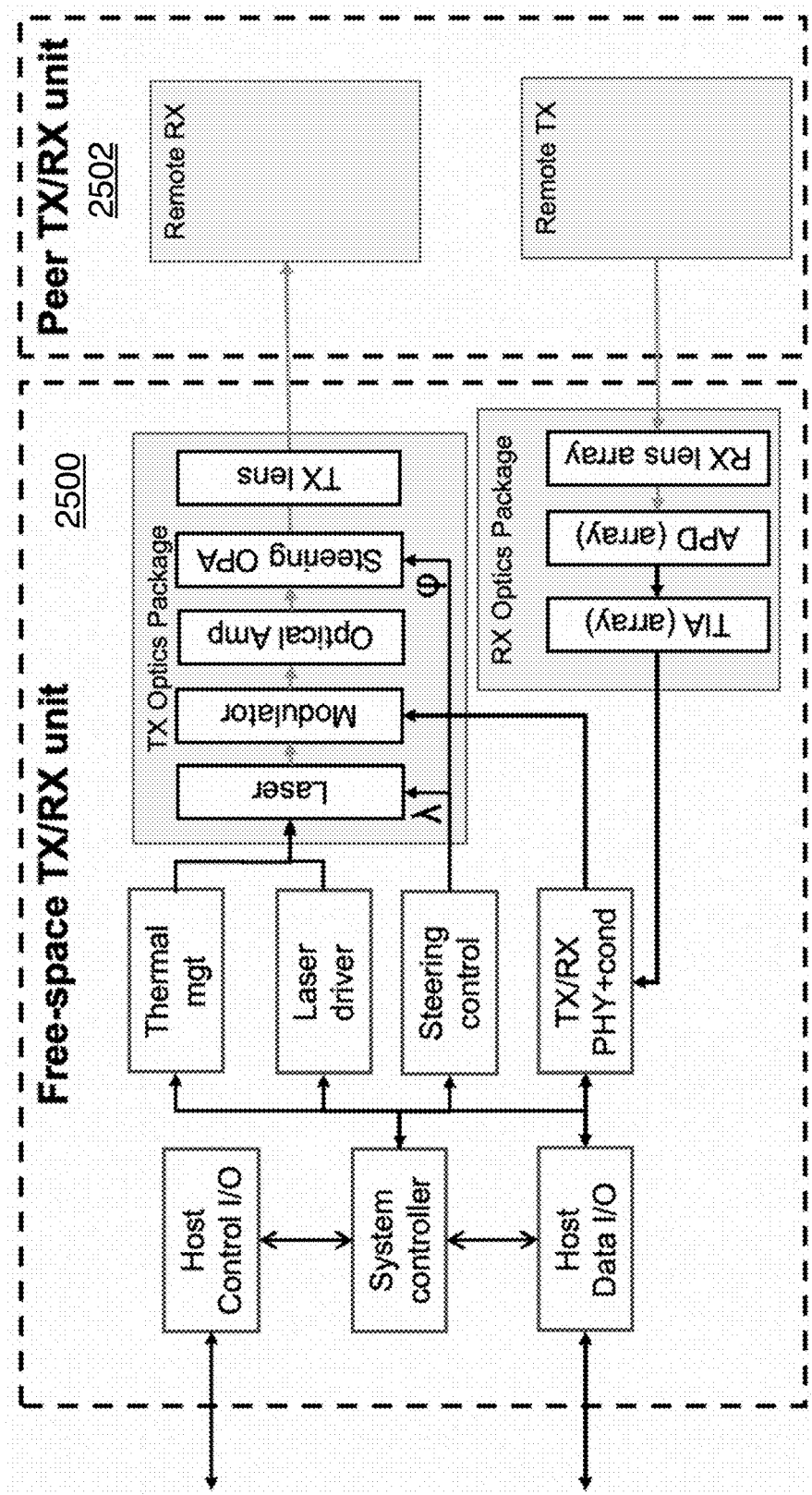
FIG. 25 is a schematic diagram of an example FSO communication system.

An example of an FSO communication system is shown in FIG. 25, which includes a free-space TX/RX unit 2500 associated with a given local node, and a peer TX/RX unit 2502 associated with a remote node. To achieve optimal signal quality, locking to the optimal direction for best signal to noise ratio and bit error rate is beneficial. Therefore, the optics packages of the receiver and the transmitter in the two nodes can be pointed towards each other and ideally have a feedback mechanism for obtaining the best direction of transmission and best pixel selection for reception. This can be done if the receiver system has power monitor circuitry and potentially an error monitoring DSP circuitry. If error correction coding, such as forward error correction (FEC) is utilized, some of the bits in the transmission data stream are used for detecting bits in error. The receiver system can monitor the amount of errors over time and correct its staring angle. The transmitter system can also receive intensity information from the remote node (e.g., over a side-channel link) to steer the transmitted beam based on that feedback to optimize the beam positioning on the detector array of the remote node, for example, using the rough alignment and fine alignment phases of the initial alignment, and the dynamic alignment, as described above.

Figure 26:
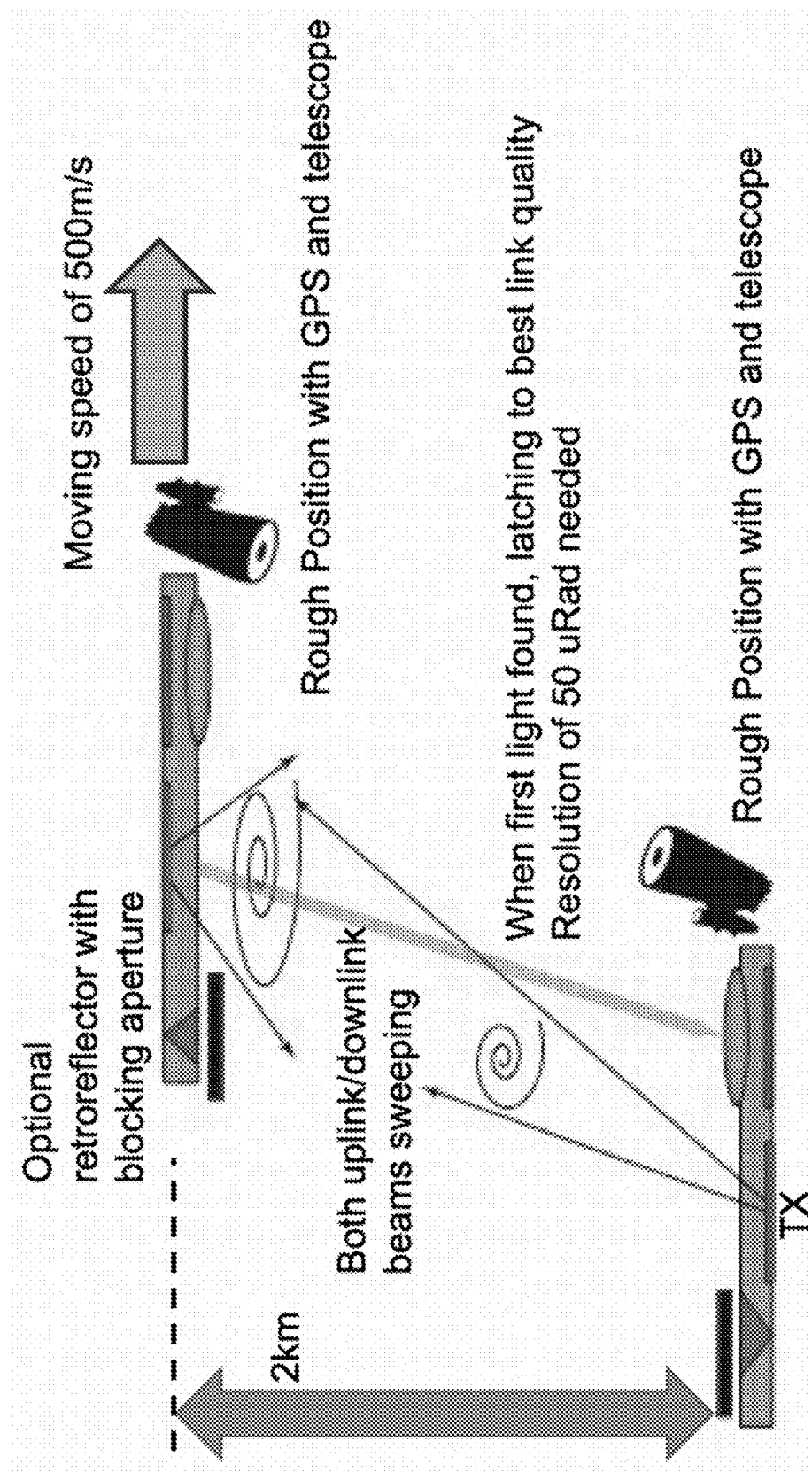
FIG. 26 is a schematic diagram of an example arrangement for dynamic beam steering.

FIG. 26 illustrates how such alignment techniques can also be used for detecting the first light. Before the FSO link is established, both transmitter and receiver can search for a direction that helps establish a line of sight link. Rough alignment can be performed with a telescope, GPS location, predetermined location agreements, and/or a temporary optical retroreflector, for example, which can aid the two nodes in establishing rough alignment.

Figure 27A:
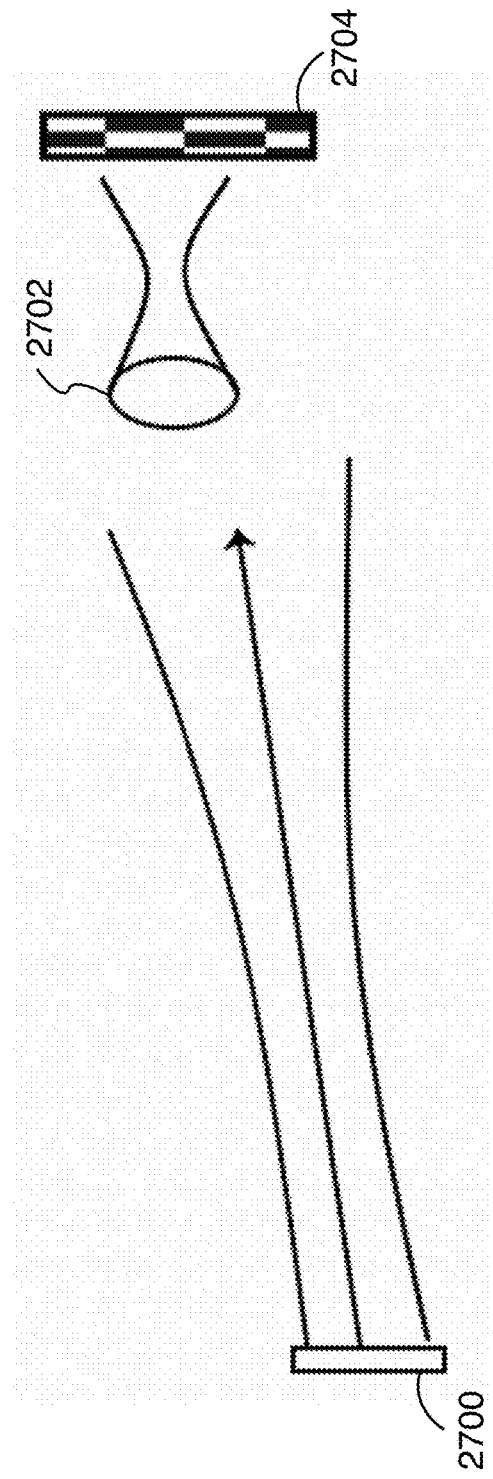
FIGS. 27A and 27B are schematic diagrams of example detection arrangements.
Figure 27B:
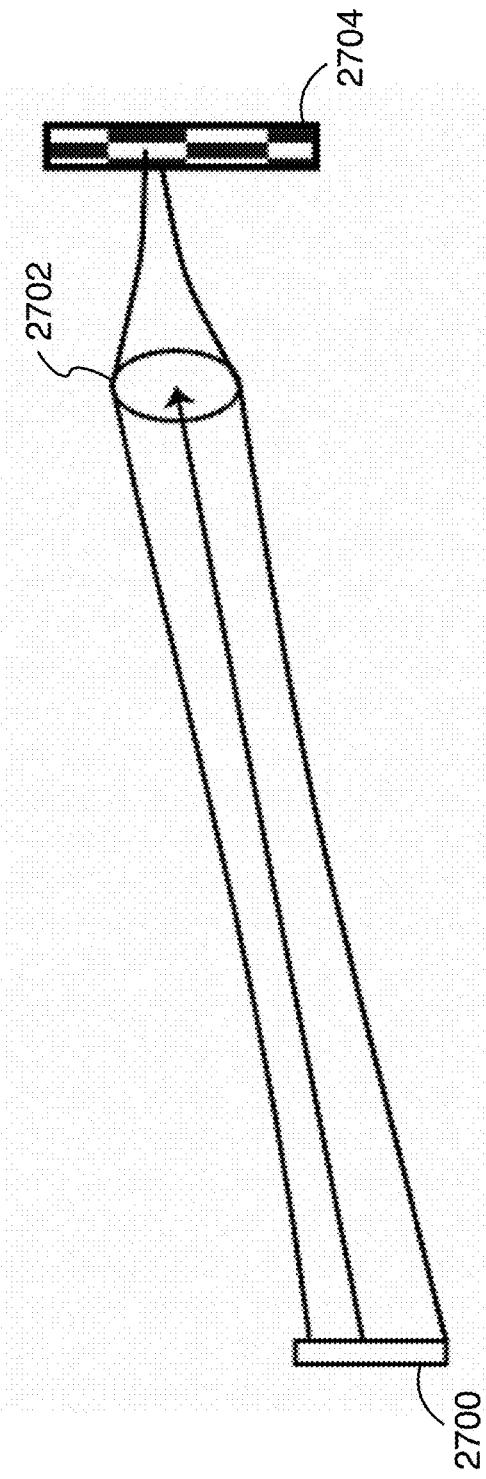

Referring to FIGS. 27A and 27B, if the transmitter uses an optical phased array 2700 as a beam steerer, and a receiver-side lens 2702 is adjustable, the beam divergence and the field of regard can initially be set to a broad angular range (FIG. 27A) on a detector array 2704 to assist finding the first light, and then can be focused to a narrowed angular range (FIG. 27B) for optimal data transmission.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for optical communication with a remote node, the apparatus comprising:
   a receiver module configured to receive at least a portion of at least one optical beam from the remote node, the receiver module comprising:
      at least one array of optical detector modules, and
      circuitry configured to control the optical detector modules and provide intensity information based on one or more signals from one or more of the optical detector modules; and
   a transmitter module configured to transmit at least one optical beam to the remote node, the transmitter module comprising:
      at least one optical phased array providing the optical beam transmitted to the remote node, and
      circuitry configured to receive intensity information from the remote node for controlling the optical phased array to steer the optical beam transmitted to the remote node.

2. The apparatus of claim 1, wherein the array of optical detector modules comprises a two-dimensional array of photodiodes that each provide a respective photocurrent to a corresponding amplifier.

3. The apparatus of claim 2, wherein the photodiodes comprise avalanche photodiodes, and the amplifiers comprise transimpedance amplifiers.

4. The apparatus of claim 2, wherein the circuitry of the receiver module is configured to determine a subset of fewer than all of the amplifiers that are powered on based at least in part on comparing the photocurrent in the corresponding amplifier to a threshold.

5. The apparatus of claim 2, wherein the circuitry of the receiver module is configured to determine a first subset of the photodiodes that are receiving at least a portion of the optical beam, and a second subset of the photodiodes that are receiving at least a portion of another optical beam.

6. The apparatus of claim 1, wherein the receiver module further comprises a light source providing a coherent local oscillator beam for coherently receiving the optical beam.

7. The apparatus of claim 6, wherein the light source provides multiple coherent local oscillator beams for coherently receiving multiple optical beams concurrently.

8. The apparatus of claim 1, wherein the intensity information from the remote node is received by the circuitry of the transmitter module over a side-channel network that is separate from a free space optical communication link with the remote node, at least during setup of the free space optical communication link.

9. The apparatus of claim 8, wherein additional intensity information from the remote node is received by the circuitry of the transmitter module for controlling the optical phased array over the free space optical communication link after setup of the free space optical communication link.

10. The apparatus of claim 1, wherein the receiver module further comprises a microlens array in proximity to the array of optical detector modules.

11. The apparatus of claim 10, wherein the receiver module further comprises at least one lens configured to focus light in proximity to the microlens array.

12. The apparatus of claim 11, wherein a distance between the microlens array and the lens is larger than or smaller than a focal distance of the lens by at least 5%.

13. The apparatus of claim 1, wherein the receiver module further comprises at least one lens configured to focus light in proximity to the array of optical detector modules.

14. The apparatus of claim 13, wherein a distance between the array of optical detector modules and the lens is larger than or smaller than a focal distance of the lens by at least 5%.

15. The apparatus of claim 1, wherein the array of optical detector modules comprises an array of photodetectors in a photonic integrated circuit.

16. The apparatus of claim 1, wherein the optical phased array comprises a two-dimensional array of optical emitters that are each coupled to a respective optical phase shifter, wherein respective phase shift signals applied to the optical phase shifters control steering of a propagation axis of the optical beam transmitted to the remote node within at least a first plane.

17. The apparatus of claim 16, wherein respective phase shift signals applied to the optical phase shifters control steering of the propagation axis of the optical beam transmitted to the remote node within a second plane perpendicular to the first plane.

18. The apparatus of claim 16, wherein wavelength tuning of optical waves emitted from the optical emitters control steering of the propagation axis of the optical beam transmitted to the remote node within a second plane perpendicular to the first plane.

19. A method for optical communication with a remote node, the method comprising:
    transmitting at least one optical beam to the remote node;
    receiving at least a portion of at least one optical beam from the remote node;
    providing intensity information based on one or more signals from one or more optical detector modules in an array of optical detector modules detecting the portion of the optical beam received from the remote node; and
    controlling at least one optical phased array to steer the optical beam transmitted to the remote node based on intensity information received from the remote node.

20. The method of claim 19, wherein the intensity information from the remote node is received by the circuitry of the transmitter module over a side-channel network that is separate from a free space optical communication link with the remote node, at least during setup of the free space optical communication link.

* * * * *